United States Patent
Graziano

(10) Patent No.: US 10,853,843 B2
(45) Date of Patent: Dec. 1, 2020

(54) PAY AS YOU GO MARKETING CAMPAIGN

(71) Applicant: Postalytics, Inc., Rockland, MA (US)

(72) Inventor: Alexander Graziano, Scituate, MA (US)

(73) Assignee: Postalytics, Inc., Rockland, MA (US)

( * ) Notice: Subject to any disclaimer, the term of this patent is extended or adjusted under 35 U.S.C. 154(b) by 514 days.

(21) Appl. No.: 14/883,062

(22) Filed: Oct. 14, 2015

(65) Prior Publication Data

US 2016/0104213 A1 Apr. 14, 2016

Related U.S. Application Data

(60) Provisional application No. 62/063,758, filed on Oct. 14, 2014.

(51) Int. Cl.
*G06Q 30/02* (2012.01)

(52) U.S. Cl.
CPC ..... *G06Q 30/0264* (2013.01); *G06Q 30/0249* (2013.01); *G06Q 30/0271* (2013.01); *G06Q 30/0273* (2013.01); *G06Q 30/0276* (2013.01)

(58) Field of Classification Search
None
See application file for complete search history.

(56) References Cited

U.S. PATENT DOCUMENTS

| | | | |
|---|---|---|---|
| 7,177,822 B2 | 2/2007 | Mahmood et al. | |
| 7,624,173 B2 | 11/2009 | Bary et al. | |
| 7,680,882 B2 | 3/2010 | Tiu, Jr. et al. | |
| 8,200,761 B1 * | 6/2012 | Tevanian | H04L 51/12 726/26 |
| 9,357,277 B1 | 5/2016 | Nijim et al. | |

(Continued)

FOREIGN PATENT DOCUMENTS

| | | | | |
|---|---|---|---|---|
| WO | WO-2007062026 A2 * | 5/2007 | | H04L 67/02 |
| WO | WO-2007150055 A2 * | 12/2007 | | G06Q 30/0277 |
| WO | WO-2016065285 A1 * | 4/2016 | | G06Q 30/0241 |

OTHER PUBLICATIONS

Anonymous, Bulk personalized URL shortening, IP.com, all pages. (Year: 2013).*

(Continued)

*Primary Examiner* — Jacob C. Coppola
(74) *Attorney, Agent, or Firm* — Wolf, Greenfield & Sacks, P.C.

(57) ABSTRACT

A computer system for creating a campaign includes at least one processor connected to a memory, the at least one processor configured to manage a plurality of system components. The system further comprises a receiving component configured to receive one or more content elements and a plurality of advertising credits, the content elements including a template, a personalized URL (pURL), and one or more user-provided content elements; a binding component configured to bind the template and the one or more user-provided content elements with the pURL to create a portion of content; a sending component configured to send the portion of content to one or more receiving users via a communication channel; and a deducting component configured to deduct one or more of the plurality of advertising credits responsive to the act of sending the portion of content to one or more receiving users via the communication channel.

29 Claims, 15 Drawing Sheets

(56) References Cited

U.S. PATENT DOCUMENTS

| | | | |
|---|---|---|---|
| 2003/0096625 A1* | 5/2003 | Lee | G06Q 30/02 455/466 |
| 2004/0085362 A1 | 5/2004 | Sauermann et al. | |
| 2004/0117400 A1* | 6/2004 | McCrystal | G06F 17/30899 |
| 2004/0225564 A1* | 11/2004 | Walsh | G06Q 30/0264 705/14.61 |
| 2006/0095422 A1 | 5/2006 | Kikuchi | |
| 2007/0011240 A1* | 1/2007 | Altberg | G06Q 30/0247 709/204 |
| 2007/0094082 A1 | 4/2007 | Yruski et al. | |
| 2007/0121846 A1* | 5/2007 | Altberg | H04M 15/00 379/114.13 |
| 2007/0168256 A1 | 7/2007 | Horstmann | |
| 2008/0065730 A1* | 3/2008 | Wilson | G06Q 10/107 709/206 |
| 2008/0086369 A1* | 4/2008 | Kiat | G06Q 30/0242 705/14.41 |
| 2008/0147810 A1* | 6/2008 | Kumar | G06Q 10/107 709/206 |
| 2008/0195466 A1* | 8/2008 | Wright | G06Q 30/02 705/14.41 |
| 2008/0195475 A1 | 8/2008 | Lambert et al. | |
| 2008/0195665 A1* | 8/2008 | Mason | G06F 17/30887 |
| 2009/0063232 A1* | 3/2009 | Lissack | G06Q 10/1095 705/7.21 |
| 2009/0249384 A1 | 10/2009 | Fang et al. | |
| 2009/0271259 A1 | 10/2009 | Fish | |
| 2009/0313116 A1* | 12/2009 | Ashbaugh | G06Q 30/0277 705/14.47 |
| 2010/0100545 A1 | 4/2010 | Jeavons | |
| 2010/0318407 A1 | 12/2010 | Leff et al. | |
| 2011/0010242 A1 | 1/2011 | Blaser et al. | |
| 2011/0055683 A1 | 3/2011 | Jiang | |
| 2011/0066689 A1 | 3/2011 | Olsson et al. | |
| 2011/0071906 A1 | 3/2011 | Kamiyama et al. | |
| 2012/0036051 A1 | 2/2012 | Sachson | |
| 2012/0101938 A1* | 4/2012 | Kasower | G06Q 20/12 705/39 |
| 2012/0266219 A1* | 10/2012 | Coleman | H04L 51/28 726/6 |
| 2012/0303467 A1 | 11/2012 | Farmer | |
| 2012/0324027 A1 | 12/2012 | Vaynblat et al. | |
| 2013/0073745 A1 | 3/2013 | Bilinski et al. | |
| 2013/0325671 A1 | 12/2013 | Glass et al. | |
| 2014/0143337 A1 | 5/2014 | McIntosh et al. | |
| 2014/0164613 A1 | 6/2014 | Mason et al. | |
| 2015/0180733 A1 | 6/2015 | Krutzler et al. | |
| 2016/0104191 A1 | 4/2016 | Graziano | |
| 2019/0058687 A1 | 2/2019 | Graziano et al. | |

OTHER PUBLICATIONS

International Search Report and Written Opinion dated Jan. 11, 2016 in connection with International Application No. PCT/US2015/055563.

International Search Report and Written Opinion dated Jan. 12, 2016 in connection with International Application No. PCT/US2015/057157.

Boldt, When Do Personalized URLs Work in Direct Marketing Campaigns? Target Marketing. Apr. 13, 2011 (serial online), <http://www.targetmarketingmag.com/article/personalized-urls-purls-effective-direct-marketing-campaigns/all/ >entire document. Last accessed Sep. 6, 2016, 5 pages.

* cited by examiner

| Contact Lists | | | |
|---|---|---|---|
| | | Total Contacts Used: 0385 | |
| Boingnet Field | Your Mailling List Field | Boingnet Field | Your Mailling List Field |
| First Name | First Name ▶ | Last Name | Last Name ▶ |
| Address1 | Address1 ▶ | Address2 | Address2 ▶ |
| City | City ▶ | State | State ▶ |
| Zip | ZipCode ▶ | Company | BusinessName ▶ |
| Occupation | Title ▶ | Email | Email ▶ |
| Mobile Phone | Cell ▶ | Twitter Handle | Twitter ▶ |
| Linkedin Id | Linkedin ▶ | Facebook Id | Facebook ▶ |
| Phone Number | LeadSource ▶ | | |
| Variable Data 1 | DOB ▶ | Variable Data 2 | Rating ▶ |
| Variable Data 3 | <Variable Data 3> ▶ | Variable Data 4 | <Variable Data 4> ▶ |
| Variable Data 5 | <Variable Data 5> ▶ | Variable Data 6 | <Variable Data 6> ▶ |
| Variable Data 7 | <Variable Data 7> ▶ | Variable Data 8 | <Variable Data 8> ▶ |

1200

FIG. 12 boingnet

Home >> Campaigns >> Campaign >> Create Personalized Campaign

◆ Create Personalized Campaign

Confirm Details

- 1301 — Campaign Info
- 1302 — Campaign Type:    Personal URL (pURL)
- 1303 — Start Date:    09/30/2014
- 1304 — Contact List:    Boingnet: Employees 2
- 1305 — Microsite Name:    Google PPG Personalized
- 1306 — Email Notification on Opened:    No
- 1307 — Email Notification on completed:    No
- 1308 — Payment Info
- 1309 — Credits to be used:    8 (8 credits example pURL addresses for this campaign)
- 1310 — Landing Page Preview
- 1311 — http://FirstName_LastName.mycompany.com/talicampaign

[Back] [Create landing pages for this campaign:]

FIG. 13

PAY AS YOU GO MARKETING CAMPAIGN

CROSS-REFERENCE TO RELATED APPLICATION

This application claims the benefit of U.S. Provisional Application No. 62/063,758, titled "PAY AS YOU GO MARKETING CAMPAIGN," filed Oct. 14, 2014, which application is herein incorporated by reference in its entirety.

BACKGROUND

Technical Field

The present disclosure relates generally to the field of pay as you go (PAYG) advertising and marketing campaigns.

SUMMARY

PAYG marketing campaigns refer to advertising by paying for the number of emails, commercials, or messages that are sent, rather than paying a flat fee beforehand. This method of marketing helps marketers control their campaigns based on how advertisements are being received. For example, if a marketer pays for an ad campaign to run for a year and then realizes the advertised product has a defect, the advertisements for a year would already be paid for despite the product being defective. With PAYG marketing campaigns, advertisements can be selectively cancelled or enforced based on sales.

Traditional PAYG marketing campaigns, however, do not allow personalized emails, web landing pages, or SMS messages targeted to specific people. The ratio between emails clicked to emails sent is very low because generic emails do not focus on any specific audience. Therefore, it is appreciated that there is a need for a way to create a personalized marketing campaign through multiple channels to increase the number of views and clicks received, yet minimizing advertising spending.

It may be useful and particularly advantageous to create a marketing campaign that uses a PAYG system in combination with personalized URLs (pURLs) in emails, landing pages, SMS phone numbers, and SMS text messages to increase click rates. Aspects and examples of marketing campaigns that use pay as you go marketing as well as monthly billing campaigns, with the potential to automatically generate personalized campaigns from a lead generation campaign, are provided.

According to one aspect, a computer-implemented method for creating a campaign is provided. The method comprises acts of receiving one or more content elements, the one or more content elements including a template, a personalized URL (pURL), and one or more user-provided content elements, binding the template and the one or more user-provided content elements with the pURL to create a portion of content including the received one or more content elements, receiving a plurality of advertising credits, sending the portion of content to one or more receiving users via a communication channel, and deducting one or more of the plurality of advertising credits responsive to the act of sending the portion of content to one or more receiving users via the communication channel.

According to one embodiment, the content elements are dynamically allocated before the act of binding. According to one embodiment, the method further comprises acts of storing the pURL in a database, tracking access of the pURL for user activity by one or more users, and creating a report responsive to tracking the access of the pURL. According to one embodiment, the created report includes a number of times the pURL was clicked on. According to one embodiment, the method further comprises an act of receiving information from a form. According to one embodiment, the portion of content is displayed within an external webpage using embed code. According to one embodiment, the embed code is in Javascript.

According to one embodiment, the advertising credits are issued as part of a pay as you go (PAYG) marketing campaign. According to one embodiment, the advertising credits are issued as part of a monthly billing marketing campaign. According to one embodiment, the credits are issued as part of a combined pay as you go marketing campaign and a monthly billing marketing campaign. According to one embodiment, the method further comprises generating shortened pURLs.

According to one embodiment, the user-provided content elements includes at least one of at least one email address associated with at least one user and at least one phone number associated with at least one user. According to one embodiment, the method further comprises an act of verifying the at least one email address prior to sending the portion of content to the one or more receiving users via the communication channel. According to one embodiment, the communication channel is email. According to one embodiment, the method further comprises an act of verifying the at least one phone number prior to sending the portion of content to one or more receiving users via the communication channel. According to one embodiment, the communication channel is a short message service (SMS).

According to one embodiment, the act of sending the portion of content includes sending a QR code. According to one embodiment, the communication channel is at least one of email, direct mail, and SMS. According to one embodiment, the system permits a campaign to be only viewed once.

According to one embodiment, the method further comprises acts of receiving second user-provided content elements from a form within the campaign, automatically generating, based on the second user-provided content elements, a second pURL targeting a second user associated with the second user-provided content elements, storing the second pURL in the database; tracking the second pURL for user activity, creating a second report responsive to tracking the user activity of the second pURL by one or more users, and comparing a first report created from user activity of a tracked first pURL to the second report. According to one embodiment, the second pURL is associated with the campaign. According to one embodiment, the portion of content is an advertisement. According to one embodiment, the advertisement is part of a campaign.

According to one embodiment, the campaign comprises a plurality of advertisements that are sent over a period of time to one or more users. According to one embodiment, the plurality of advertisements are sent according to a predefined schedule. According to one embodiment, the plurality of advertisements are sent responsive to behavior of a receiving user. According to one embodiment, the plurality of advertisements are sent responsive to information of the one or more receiving users. According to one embodiment, the template is received from a library of templates. According to one embodiment, the method further comprises an act of verifying the second user-provided content elements.

According to one embodiment, the advertising credits expire after an amount of time. According to one embodiment, the portion of content is a microsite. According to one embodiment, the act of sending the portion of content to the one or more receiving users via the communication channel further comprises an act of verifying addresses of the one or more receiving users. According to one embodiment, the at least one of the at least one or more content elements is received from an Application Programming Interface (API). According to one embodiment, the method further comprises the act of, responsive to at least one of the one or more receiving users not interacting with the portion of content in a predetermined way, resending the portion of content to the at least one receiving user.

According to one aspect a system for creating a campaign is provided. According to one embodiment, the system is a computer system. According to one embodiment, the system is a distributed computer system. The system comprises at least one processor operatively connected to a memory, the at least one processor configured to manage a plurality of system components, wherein the system further comprises a receiving component configured to receive one or more content elements and a plurality of advertising credits, the one or more content elements including a template, a personalized URL (pURL), and one or more user-provided content elements, a binding component configured to bind the template and the one or more user-provided content elements with the pURL to create a portion of content including the received one or more content elements, a sending component configured to send the portion of content to one or more receiving users via a communication channel, and a deducting component configured to deduct one or more of the plurality of advertising credits responsive to the act of sending the portion of content to one or more receiving users via the communication channel.

According to one embodiment, the content elements are dynamically allocated before the binding component binds the template and the one or more user provided content elements with the pURL. According to one embodiment, further comprising a storing component configured to store the pURL in a database, a tracking component further configured to track access of the pURL by one or more users, and a reporting component configured to create a report responsive to tracking the access of the pURL by one or more users. According to one embodiment, the created report includes a number of times the pURL was clicked on. According to one embodiment, the system further comprises a receiving component configured to receive information from a form.

According to one embodiment, the portion of content is displayed within an external webpage using embed code. According to one embodiment, the embed code is in Javascript. According to one embodiment, the advertising credits are issued as part of a pay as you go (PAYG) marketing campaign. According to one embodiment, the advertising credits are issued as part of a monthly billing marketing campaign. According to one embodiment, the credits are issued as part of a combined pay as you go marketing campaign and a monthly billing marketing campaign. According to one embodiment, the system further comprises a component configured to generate shortened pURLs.

According to one embodiment, the user-provided content elements includes at least one of at least one email address associated with at least one user and at least one phone number associated with at least one user. According to one embodiment, the system further comprises a verifying component configured to verify the at least one email address prior to the sending component sending the portion of content to one or more receiving users via the communication channel. According to one embodiment, the communication channel is email. According to one embodiment, the system further comprises a verifying component configured to verify the at least one phone number prior to the sending component sending the portion of content to one or more receiving users via the communication channel. According to one embodiment, the communication channel is SMS.

According to one embodiment, the portion of content includes a QR code. According to one embodiment, the communication channel is at least one of email, direct mail, or short message service (SMS). According to one embodiment, the system permits a campaign to be only viewed once.

According to one embodiment, the system may further comprise a second receiving component configured to receive second user-provided content elements from a form within the campaign, a generating component configured to automatically generate, based on the second user-provided content elements, a second pURL targeting a second user associated with the second user-provided content elements, a storing component configured to store the second pURL in the database, a tracking component configured to track the second pURL for user activity, a creating component configured to create a report responsive to tracking the user activity of the second pURL by one or more users, and a comparing component configured to compare a first report created from user activity of a first tracked pURL to the second report.

According to one embodiment, the second pURL is associated with the campaign. According to one embodiment, the portion of content is an advertisement. According to one embodiment, the advertisement is part of a campaign. According to one embodiment, the campaign comprises a plurality of advertisements that are sent over a period of time to one or more users. According to one embodiment, the plurality of advertisements are sent according to a predefined schedule. According to one embodiment, the plurality of advertisements are sent responsive to behavior of a receiving user. According to one embodiment, the plurality of advertisements are sent responsive to information of the one or more receiving users.

According to one embodiment, the template is received from a library of templates. According to one embodiment, the system may further comprise a verifying component configured to verify the second user-provided content elements. According to one embodiment, advertising credits expire after an amount of time. According to one embodiment, the portion of content is a microsite. According to one embodiment, the sending component is further configured to verify addresses of the one or more receiving users.

According to one aspect, a non-transitory computer readable medium having stored thereon sequences of instructions for creating a campaign is provided. The instructions include instructions that will cause at least one processor to receive one or more content elements, the one or more content elements including a template, a personalized URL (pURL), and one or more user-provided content elements, bind the template and the one or more user-provided content elements with the pURL to create a portion of content including the received one or more content elements, receive a plurality of advertising credits, send the portion of content to one or more receiving users via a communication channel, and deduct one or more of the plurality of advertising credits responsive to the act of sending the portion of content to one or more receiving users via the communication channel.

According to one embodiment, the content elements are dynamically allocated before the act of binding. According to one embodiment, the non-transitory computer readable medium further comprising instructions that will cause the at least one processor to store the pURL in a database, track access of the pURL by one or more users, and create a report responsive to tracking the access of the pURL by one or more users. According to one embodiment, the created report includes a number of times the pURL was clicked on.

According to one embodiment, the non-transitory computer readable medium further comprises an instruction that will cause the at least one processor to receive information from a form. According to one embodiment, the portion of content may be displayed within an external webpage using embed code. According to one embodiment, the embed code is in Javascript. According to one embodiment, the advertising credits are issued as part of a pay as you go (PAYG) marketing campaign. According to one embodiment, the advertising credits are issued as part of a monthly billing marketing campaign. According to one embodiment, the credits are issued as part of a combined pay as you go marketing campaign and a monthly billing marketing campaign.

According to one embodiment, wherein the non-transitory computer readable medium further comprises an instruction that will cause at least one processor to generate shortened pURLs. According to one embodiment, the user-provided content elements include at least one at least one email address associated with at least one user and at least one phone number associated with at least one user. According to one embodiment, the non-transitory computer readable medium further comprises an instruction that will cause at least one processor to verify the at least one email address prior to sending the portion of content to one or more receiving users via the communication channel. According to one embodiment, the communication channel is email. According to one embodiment, the non-transitory computer readable medium further comprises an instruction that will cause at least one processor to verify the at least one phone number prior to the sending component sending the portion of content to one or more receiving users via the communication channel. According to one embodiment, the communication channel is SMS.

According to one embodiment, the portion of content includes a QR code. According to one embodiment, the communication channel may be email, direct mail, or SMS. According to one embodiment, the non-transitory computer readable medium further comprises an instruction that will cause at least one processor to permit a campaign to be only viewed once.

According to one embodiment, the non-transitory computer readable medium further comprises instructions that will cause at least one processor to receive second user-provided content elements from a form within the campaign, automatically generate, based on the second user-provided content elements, a second pURL targeting a second user associated with the second user-provided content elements, store the second pURL in the database, track the second pURL for user activity, create a report responsive to tracking the user activity of the second pURL by one or more users, and compare a first report created from user activity of a first tracked pURL to the second report. According to one embodiment, the second pURL is associated with the campaign.

According to one embodiment, the portion of content is an advertisement. According to one embodiment, the advertisement is part of a campaign. According to one embodiment, the campaign comprises a plurality of advertisements that are sent over a period of time to one or more users.

According to one embodiment, the plurality of advertisements is sent according to a predefined schedule. According to one embodiment, the plurality of advertisements is sent responsive to behavior of a receiving user. According to one embodiment, the plurality of advertisements is sent responsive to information of the one or more receiving users.

According to one embodiment, the template is received from a library of templates. According to one embodiment, the non-transitory computer readable medium further comprises an instruction that will cause at least one processor to verify the second user-provided content elements. According to one embodiment, the advertising credits expire after an amount of time. According to one embodiment, the portion of content is a microsite. According to one embodiment, the non-transitory computer readable medium further comprises an instruction that will cause at least one processor to verify addresses of the one or more receiving users.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of any particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIG. 12 is an example user interface of data mapping;

FIG. 13 is an example user interface of a campaign confirmation page;

DETAILED DESCRIPTION

Figure 1:
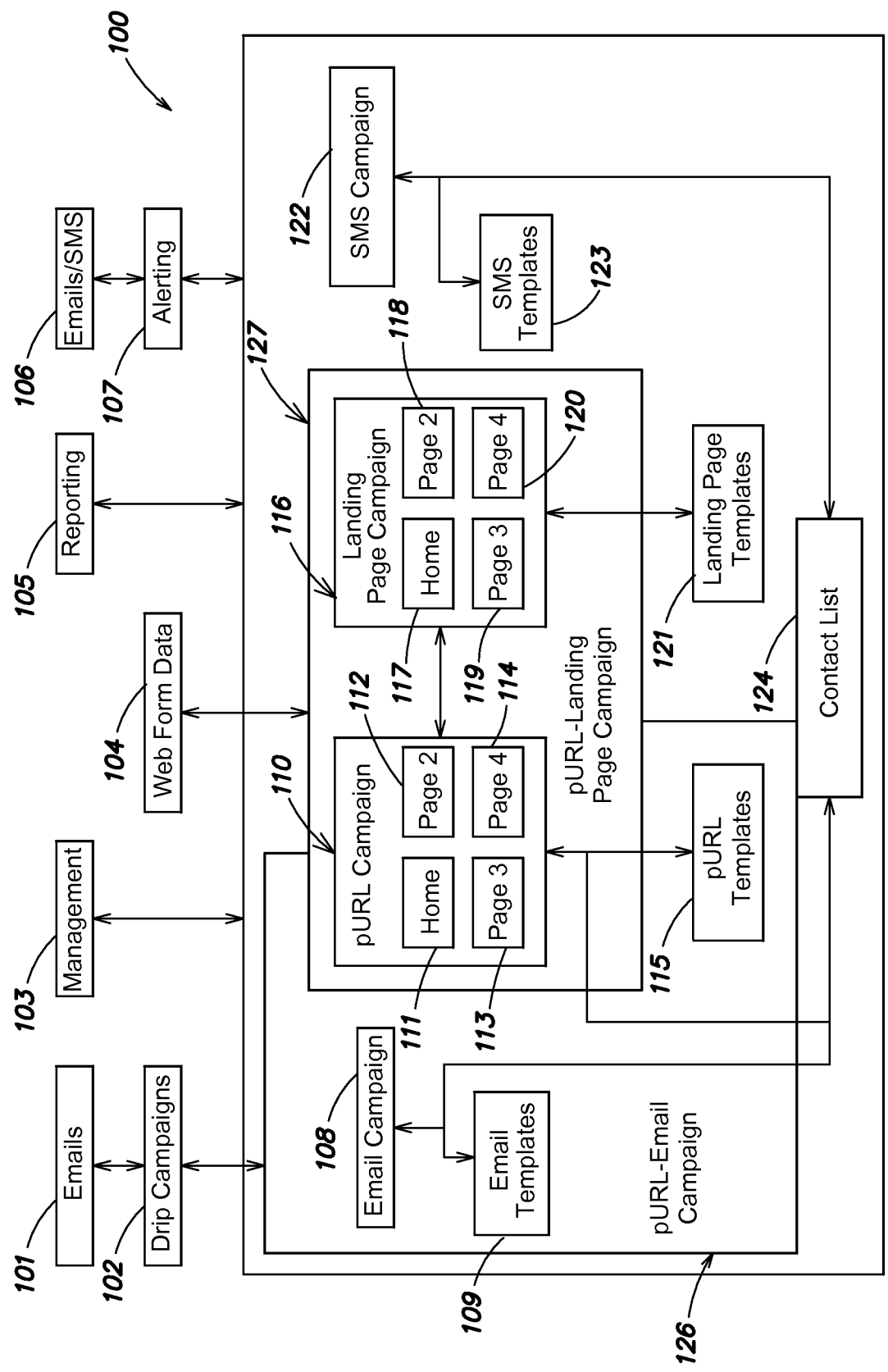
FIG. 1 is a block diagram of an example PAYG system environment, according to one embodiment.

Stated broadly, aspects and embodiments of the invention are directed to marketing operations. In one aspect, a marketing system can create a PAYG marketing campaign. Embodiments disclosed herein manifest the realization that methods and systems are needed to address some of the shortcomings of conventional PAYG marketing campaigns with regard to receiving higher click rates and being successful. In particular, there is a need for a way to personalize marketing campaigns to customize each campaign to target a user or group of users.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Various embodiments use user information to create a marketing campaign that sends messages through a plurality of channels, including email, short message service (SMS) text messages, and direct mail. Electronic campaigns, including email campaigns and text message campaigns, may use personalized URLs, or "friendly URLs," to increase the number of messages that result in a positive response. A positive response includes a received click on a pURL or an opening of an email or SMS text message sent within a marketing campaign. A "friendly URL" is a URL that is personalized and targeted at a specific user or a group of users, keyword, or keyword phrase. For example, "John_Doe.boingnet.com/fallsales" may be a URL targeting a user named John Doe with a keyword phrase of fall sales.

A campaign may be sent to individual users or a group of users, the personalized URL may be generated automatically based on user information or manually by a received input. It may be appreciated that a certain "friendly URL" may be chosen to make it simpler for a human or a search bot to read, type into a browser, and understand the content of the underlying webpage. The "friendly URL" may also include keywords that make the page easier to appear on search engines. For example, if a pURL created is boingnet.com/Friendly_URL_Webinar, then a human on a search engine website such as, for example, Google or Yahoo, may see the pURL show up after typing in "Friendly URL." The URL may lead to a landing page that is based on a template.

The template may come from a template builder that includes multiple customizable parts of a landing page, including the header, body, footer, background, and fonts. The landing pages and emails can be created using HTML, CSS, Javascript, jQuery, Python, Ruby, PHP, and any other coding language, in combination with any type of database and other applications that may be used to generate content, including Adobe Flash and third-party widgets. A campaign may also be created via SMS text messages. In those campaigns, the computer may receive instructions to send personalized text messages to each user and include a landing page that is optimized for mobile devices via a "friendly URL." The "friendly URL" sent to a mobile device may be a shortened pURL that can be displayed easily on a small mobile device screen. The computer may also receive input to add a direct mail channel that includes sending mail to a user's address. The direct mail may also be personalized using the user information within the marketing campaign. In one embodiment social networks may also be used as a communication channel within an advertising campaign.

In some embodiments the marketing campaign may use a pay as you go (PAYG) method of payment which involves receiving electronic money via a credit card, Paypal, a third-party application, or any other method of receiving money electronically. The computer may exchange the credits for electronic money. The credits may be deducted from a user's account when a message within a marketing campaign is sent out. This way, it may be appreciated that the marketing campaign can be updated and directed based on how well the marketing campaign is doing. In some embodiments credits in a PAYG plan associated with a user account may be set to last a certain amount of time before expiring (e.g., credits expire after a year of being purchased). In other embodiments the marketing campaign is a monthly billing marketing campaign, in which a flat fee may be charged every month for a limited or unlimited number of campaigns and webpages. The monthly plans may be limited on number of landing pages, embeddable forms, page view, drip campaigns, email campaigns, personalized campaigns, personal URLs, QR codes, emails per month, text message per month, direct mail messages per month, receiving users, and others. In other embodiments a marketing campaign may use a monthly plan with additional PAYG credits. If a plan does not include, for example, direct mail, then additional direct mail credits may be sent.

In some embodiments, notifications may be sent to a client based on clicks or opens on or within a pURL. Reports may be sent indicating how many times a specific pURL or a group of pURLs within a campaign have been opened. In some embodiments each page within a campaign can be individually monitored. Further, in response to receiving information, such as information from a form, a thank you email based on an email template library may automatically be sent to a user. In other embodiments, in response to an action being performed within a page, the computer may redirect a user to a thank you page designed from a webpage template library. In other embodiments an SMS text message may be sent to a user in response to received information from a page. The system can be configured to automatically send a thank you email responder or a thank you URL responder that can be automatically generated in response to a filled out form. The system can also, automatically or in response to a received control, redirect a user to another URL. The system can be further configured to collect statistics including parameters such as variable data within the redirected URL. Variable data can include unique tracking codes and sales representatives identifications, learned or acquired information about the user such as birthday or last purchase date, among others. Variable logic can introduce unique content elements to certain viewers of a pURL, email, or SMS, based upon if/then logic statements using variable data. For example, a donor for a non-profit organization that contributes over a threshold may see content welcoming them to the VIP donor group.

FIG. 1 shows a block diagram of an example marketing campaign service and system suitable for incorporating various aspects of the present invention. For instance, a marketing campaign may include a contact list 124 to specify a user or a group of targeted users. The marketing campaign may consist of any combination of an email campaign 108, a pURL campaign 110, a landing page campaign 116, and an SMS campaign 110. Each campaign includes templates (e.g., email templates 109, pURL templates 115, landing page templates 121, and SMS templates 123) within a template builder than may be displayed within a point-and-click interface. Each template can be customized with text, images, videos, links, sounds, forms and any other design elements. A group of premade creative elements may be displayed and used within a webpage and additional elements may be accepted to be included in the webpage. Each campaign may use a template with a plurality of design elements as well as a pURL and metadata defining the campaign.

The template, creative elements, pURL, and metadata may all be bound together at instantiation of the page, text message, or email. The email campaign includes email templates and can include a pURL chosen for each user. The email campaign can be tracked by how many times an email is opened and how many times the pURL within the email is selected or opened. Sections of the email, landing page, and pURL may be automatically filled in with sections of user information. The pURL may have subpages that are each individually tracked. Each pURL is stored within a database along with the information of which users selected or opened the pURL and which forms were filled out within the webpage by which users. The pURL can be created in a variety of formats including a client's company website or Boingnet's URL such as, for example, JohnDoe.companyname.com, John.companyname.com/springcampaign, companyname.com/JohnDoe, and boingnet.com/JohnDeals. The generated pURLs can also last for a certain period of time, for example, for two months while a campaign is ongoing or until the next pURL is created.

In some embodiments, personalized URLs can be placed into a separate test mode can receive updated information in the middle of a campaign. The updated campaign may be tracked, and the tracking information may include the page URL, the page name, the status of each page, the date each page was created, the date each page was last updated, the date each page was accessed by a user, and the times associated with each date, among other information. Information regarding filled out forms, clicked links, and opened emails or messages may also be tracked. In some embodiments a group of emails or phone numbers may be verified prior to the sending of a campaign. This method of list cleaning can be used to avoid wasting credits on users that have incorrect or out of date information (e.g., incorrect contact information). A list may be cleaned by checking emails for syntax errors, common mistypes, disposable emails, and valid domains.

A more thorough email verification may be done by attempting to send a sample message to each email to check if each email address exists within a domain. For instance, if an email is bounced and cannot be sent, then the receiving email address is indicated as invalid and is marked to inform the client. In some embodiments, an Edit Lists page is provided that displays which contacts on a contact list are invalid and may receive inputs to search through a list, edit a list, add users to a list, or delete contacts from a list. In one embodiment, the Edit Lists page may also include a control to clean the email addresses to check if any of the email addresses are invalid. Each pURL campaign may include a plurality of pages, including a homepage 117 as well as pages that the homepage may link to. Each landing page may also include a plurality of pages. In one implementation, the pURL pages and landing pages are all completely customizable. In addition to images, videos, links, and text, each page may also communicate with third-party applications. For example a Google Maps widget may be used to display a specific location, or a Facebook widget may be used to share a link to a page within a campaign with a social network.

The marketing campaign may also be associated with drip campaigns 102, wherein a set of scheduled actions may occur based upon behavioral segmentation and profile driven segmentation of a campaign as of the date and time of the set of scheduled actions. For example, if a drip campaign begins in the beginning of a month (e.g., September), the drip campaign may be set to send another email in the middle of the month if the first set of emails were successful. The campaign may be alternatively set to send an email or text message every four weeks until a message is successfully received.

In one embodiment, the drip campaign method of marketing allows automatic management of a campaign without a need to receive further instructions within a campaign. The management module 103 may manage all of the elements of the campaign and update them according to user information. In another implementation, drip campaigns 102 also allow a contact list to be segmented based upon the interactions between the members of the list and the dynamically generated campaign elements to create subsequent automated actions within the campaign. For example, if half of the users in a contact list select an email advertising indicating an upcoming sale, the campaign drip may be set to send that half of the users a second email advertising specific promotions within the sale and the other half of the users may receive a more generic sales advertisement. Further, drip campaigns may take user inputs and adapt messages based on those inputs. For example a user may choose to hear more about advertisements relating to sales on men's clothing, and then periodically receive more emails for men's clothing.

The contact list may be further segmented in response to a certain number of emails not being selected. For example, if eight emails were sent out and all ignored, the receiving user may be moved into a list of users that are indicated to receive fewer messages. In one embodiment, a step or series of steps may be performed on a list of users that have not yet engaged with the campaign, or have met or failed to meet other conditions. For example, if a user has not clicked on any of the first three messages in a drip campaign 102, the campaign may be "restarted" for the user, with the first message being re-sent, followed by the second, etc., in an attempt to engage the user. In another example, a user that has engaged with many early message in a drip campaign 102 may be provided with more frequent messages, or may be omitted from additional early messages in favor of receiving messages scheduled for later in the campaign.

In some embodiments, additional timing constraints may be placed on a drip campaign 102. For example, a cutoff date may be provided such that no further messages may be sent after a particular date, no matter how far into the campaign a particular user is. It may be necessary to automatically terminate a drip campaign 102 after the event that is the focus of the campaign has passed. For example, a drip campaign 102 for a "Black Friday" promotion may be set to terminate on Black Friday, even for users that have not received all of the messages in the drip campaign. In some embodiments, the system may compress the drip campaign 102 for users who begin the campaign late, or for users who have been re-started after not engaging with the beginning of the campaign. For example, a drip campaign 102 scheduled to last for 4 weeks may be fit into 10 days if necessary by compressing the amount of time between messages, to allow such "late" users to experience the whole drip campaign 102 by the cutoff date.

In some embodiments, it may be desirable for branding reasons for the messages sent in a campaign to come from an email address associated with a domain name recognizable to the recipient of the message. In one example, functionality is provided in the management module 103 for a user to register a domain name for use as part of advertising campaign. For example, a user administering a campaign to advertise products from ABC, Inc. may be provided the opportunity to register and configure the domain <ABCpromos.com> in the management module 103. Once the domain is purchased, the user may be provided the opportunity to configure it, and provision all backend resources, in the management module 103. For example, the user may be prompted to create email addresses on the domain from which messages will be sent. In some embodiments, configuration and provisioning may be handled automatically by the management module 103 or other component according to predetermined specifications.

The reporting module 105 may be associated with the marketing campaign and used to periodically send a client reports based on the tracking of a group of pURLs. The reports can include a timeline of how many clicks and opens occurred within a time range as well as what forms have been submitted and if any user referrals occurred. The reports may include information about any users added to a campaign via another user as well as tracking information for the added user, such as how many clicks were received from a user for a specific pURL. A report may be provided that shows information about which forms were completed within a webpage and can also export any information relating to the pURL into, for example, a comma separated value (.csv) file or any other file. The reports may also be exported into an email or other type document in any format.

In some embodiments, the alerting module 107 may alert a client when an action is performed such as a click of a pURL or an opening of an email for a specific user or group of users. The alerting module may be configured to send an email with user information when a new user is added to a campaign. The marketing campaign may further be configured to create web form data 104. The web form data 104 includes embed code that allows a pURL, landing page, or microsite to be put into other pages via a snippet of HTML code. The advertised portions of the landing page may be customized to show an image or contain text relating to the campaign. The embed code may allow pages of a microsite to be displayed in a web page that is not associated with the platform provider (e.g., Boingnet) in any way. Data regarding the usage of the template within the third-party website is tracked as well as data that is inputted from the third-party webpage onto the Boingnet template.

The embed code may be a uniquely created set of Javascript that is associated with the page template, the microsite, and the campaign within the platform provider (e.g., Boingnet). A microsite is an individual web page or a small cluster of pages that are meant to function as a discrete entity within an existing webpage or to complement an offline activity. Information regarding the microsite can be stored in a library and can be edited while live. According to one embodiment, each microsite can be used in more than one campaign simultaneously, as they are put into production during campaign generation. The web form data also includes a QR code that may be generated to lead to a landing page. A user may access a landing page or a pURL customized with a mobile interface via a QR code. Also, in another implementation, a unique QR code may be added for each page in a landing page campaign. Further, in some embodiments a shortened pURL may be generated to make landing pages easier to share on social media such as Twitter, Facebook, Foursquare, Google+, LinkedIn, or any other social media network.

Figure 2:
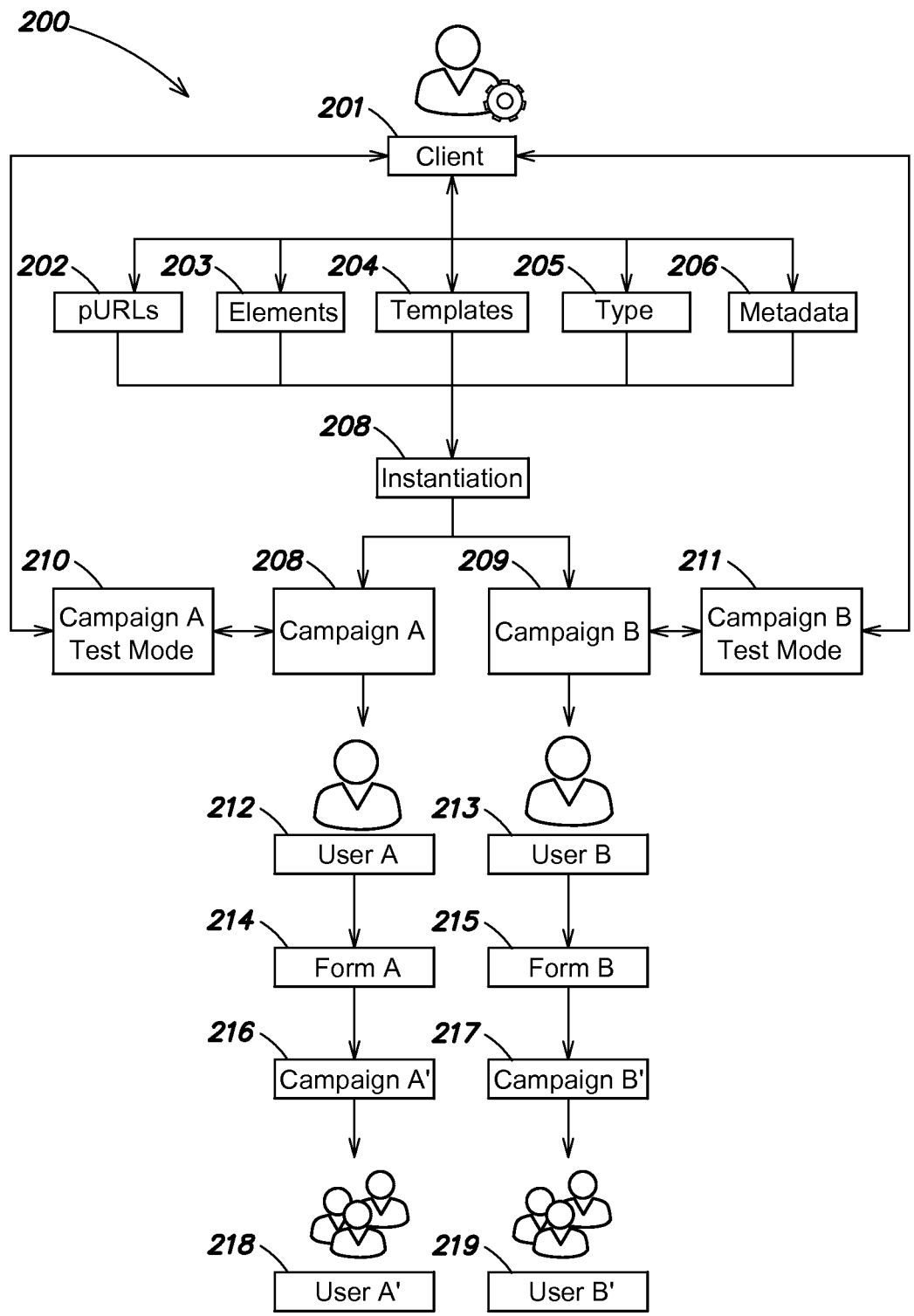
FIG. 2 is a block diagram of an example process for campaign creation and distribution, according to some embodiments.

FIG. 2 shows a block diagram showing an example of how a marketing campaign 200 is created and how it may be shared with users. The system may receive input from a client 201 for customization information relating to a campaign. A campaign includes of a type 205 (e.g., SMS text campaign, email campaign, pURL campaign, direct mail campaign, etc.), and a plurality of templates 204, elements 203, pURLs 202, and metadata 206 used for the pages, emails, or text messages sent in the campaign. Before and after instantiation 207, the campaign pages are created within a sandbox environment (e.g., campaign A test mode 210 and campaign B test mode 211) that can be edited and previewed without being deployed.

The creative elements 202-206 all come together before being instantiated and after being instantiated, the creative elements are used to compose pages within different campaigns. Campaign A 208, for example, is generated specifically for at least one User A 212 and Campaign B 209 may be generated for at least one User B 213. Each campaign may have its own pages with individual pURLs, elements, templates, and metadata. A campaign may have different types. For example, a campaign may be both an email campaign and a text message campaign. The campaign may sell complementing messages via multiple channels to increase click rates. Some pages may also, for example, have an option to send a deal to a mobile phone via a QR code or an SMS text message. One feature of a page that may be sent to a specific user is a "one time use" feature. This feature enables controls to be put into place to allow for only one view of a pURL and associated campaign elements. One advantage of the "one time use" feature is that some marketing campaign pages may include elements such as a roulette game that allows a user to win a prize. To avoid letting the user play the game multiple times, the "one time use" feature limits the number of times the user can access a page to one.

In some embodiments metadata information may be used in combination with a "friendly URL" to make pages in a marketing campaign receive more views via search engines. Metadata information and "friendly URLs" may be used to control the method by which web browsers display content. The combination of metadata information and "friendly URLs" may also allow the system to track activity of a campaign using $3^{rd}$ party tools. Metadata information may include a page title, a site name, meta-descriptions, and custom meta-tags. All of the information may be customized by received inputs depending on what targeted searches the webpage should be shown from. For example, if the marketing campaign is for a new flavor of frozen yogurt, the computer may receive multiple tags and words relating to frozen yogurt within different pages of the campaign and within the metadata relating to the campaign. This way, if someone were to type in "frozen yogurt" into a search engine, the landing page may show up early enough to be displayed to the user. In other embodiments the campaign may be able to add various keywords to the meta-tags based on previously entered keywords and keywords within the HTML text, pictures, videos, and links.

Each campaign can also be put into test mode (e.g., campaign A test mode 210 and campaign B test mode 211). A campaign test mode allows a landing page or an email within a campaign to be modified while they are live, with creative and technical elements such as pages, content, links, and others without affected the live page. In some embodiments campaigns are paused and put into "test mode" where pages can be viewed and forms can be filled out without changing the actual tracking associated with the campaign. After edits are done, the updated pages may replace the current pages. In some embodiments the old pages may be accessed and tracked while edits are being made.

In some embodiments, a template may include a "Tell a Friend" feature that allows the system to receive a form from a member of a personalized campaign about an anonymous person and subsequently create, store, and track a pURL associating that anonymous person with a personalized campaign. In some embodiments the anonymous person may be added to the lead campaign. In one embodiment, the system is configured to deduct credits from a client based on the anonymous person being added to the campaign. In other embodiments, a user may import a portion of a contact list from a social media website to a campaign, and the system may be configured to create, store, and track pURLs associating each of the anonymous people with a personalized campaign. In these embodiments, the system may automatically receive user information from social media profiles for the pURL campaign. In some embodiments the system may receive information via a form, such as form A 214 for campaign A 208 and form B 215 for campaign B 209, that may be located on a microsite or page within a campaign. The computer may use the received information from the form to create a new campaign for a new user and associate the new campaign with the campaign that the form was taken from. The information received from the form may include information such as a first name, last name, email, phone number, Twitter handle, Facebook Id, and other information about one or more anonymous people including variable data. The at least one anonymous people, such as Users A' 218 and Users B' 219, may be added to the lead generation campaign. A new group of landing pages, emails, text messages, and direct mail messages may be created for the new at least one user.

Figure 3:
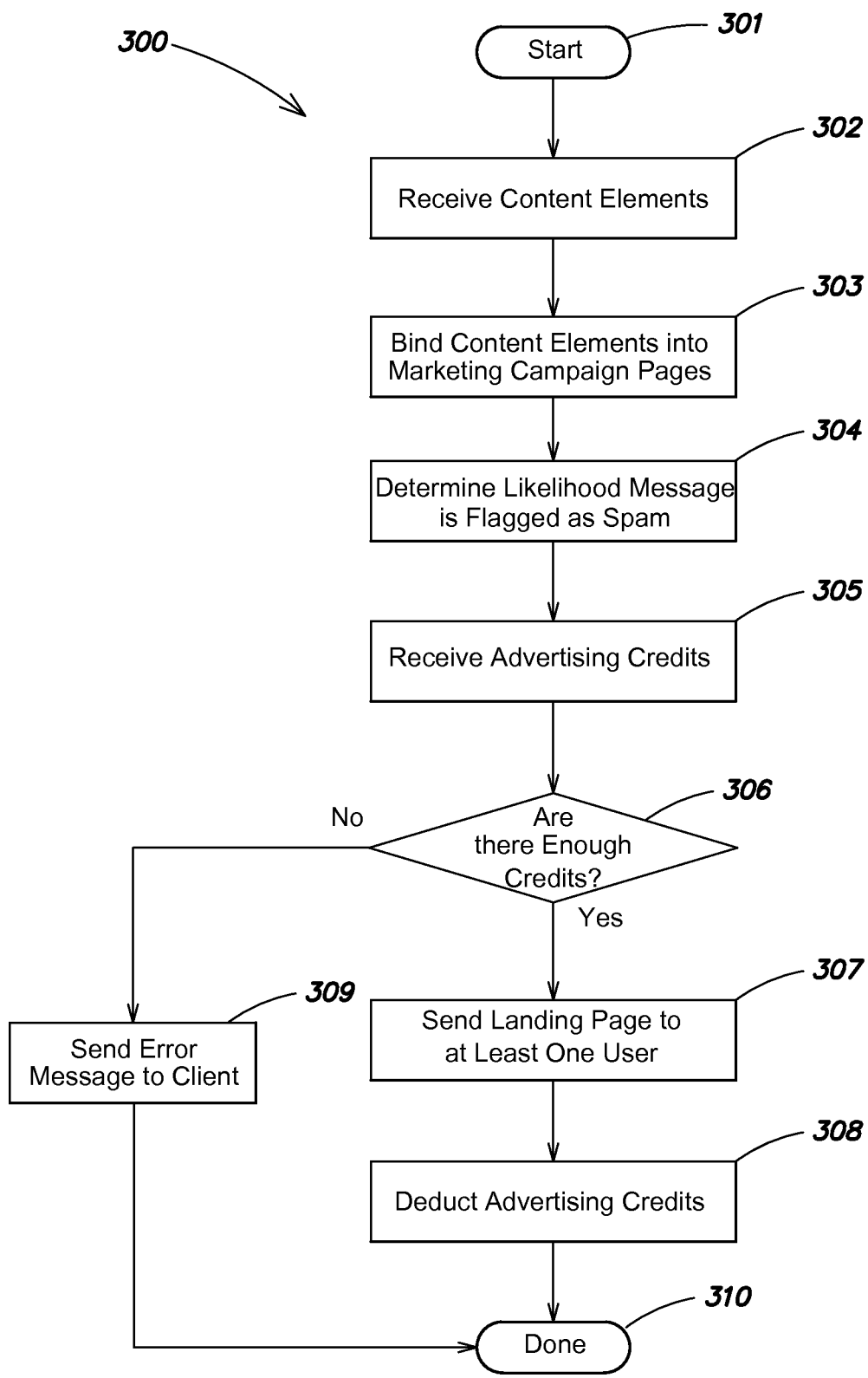
FIG. 3 is a flow diagram illustrating an example process for receiving and deducting credits, according to one embodiment.

FIG. 3 shows a process 300 for creating landing pages within a marketing campaign according to one embodiment of the present invention. At block 301, process 300 begins. At block 302, the computer receives content elements that define creative elements such as templates for each page within a marketing campaign, images, videos, links, pURLs, QR codes, and third-party widgets. An editing page is displayed that takes inputs via a point-and-click interface to create the layout of each page as well as which pages link to each other. Metadata is also received for each page as well as user information defining email addresses and phone numbers to send messages to in a campaign. The number of messages to be sent and how often to send a new message are received as well. Once all of the information and assets for all of the initial channels of the marketing campaign are received, at block 303, the computer may bind the content into marketing campaign pages, emails, and SMS text messages. Each bound page within the marketing campaign has a unique pURL. Each bound SMS text message may have an individual message to each specific user based on user information. Each generated direct mail message may also have a unique message with unique user information included.

At block 304, the generated email message may be automatically examined by the system to determine if the message is likely to be flagged as spam. Various pieces of data and metadata may be examined to make such a determination. For example, the text in the subject or body of the message is examined to determine how likely the syntax appearing there is likely to cause the message be flagged by a recipient's messaging system as spam. A database of words or phrases that may be cause an issue may be referred to. In some embodiments, the ratio of text to images in the message may be determined, with a relatively high ratio of images more likely to cause the message to be flagged as spam. In some embodiments, the email address to be used for sending messages in the campaign is analyzed to determine how likely the message is to be flagged as spam. In some cases, the use of large commercial re-mailers may be viewed by recipients of the message as indicia that the message is a spam.

The likelihood of the message being flagged as spam is report to the user. In some embodiments, a numerical "spam score" is calculated and communicated to the user. For example, a score may be provided on a scale of 0 to 10, with messages scoring close to 0 being the least likely to be flagged as spam, and messages with a score of 5 or higher likely to be flagged as spam. In some embodiments, the user is provided specific information as to why the message received the score it did, and may be provided with suggestions to reduce the score. For example, the user may be told that the number of images in the email is relatively high compared to the amount of text. As another example, the user may be told that removing the word "FREE!!," or that changing the punctuation or capitalization of the text, may improve the score. For messages receiving over a certain score, the user may be prompted to return to the message to make any edits as necessary. If the system determines that the email address used to send messages as part of the campaign is likely to cause the message to be flagged as spam, the user may be presented with the opportunity to register and configure a custom domain, as discussed above.

At block 305, the computer receives advertising credit to send the initial batch of messages. Advertising credits may be received via a pay as you go plan, a monthly plan, or a combination of a pay as you go plan and a monthly plan.

According to one embodiment, at block 306, the computer checks to see if the received advertising credits are enough to send the initial batch as well as the next batch of messages within the advertising campaign. At block 307, if the number of advertising credits is not enough, the computer may send a message via the Boingnet website that there are not enough credits for the campaign. Options may be displayed to reduce the number of channels or to add more credits. At block 308, if and when there are enough credits, the campaign may be delivered to one or more users via a plurality of channels, including email, direct mail, and SMS text messaging. At block 309, once the messages are all sent out, the computer may deduct advertising credits from a client's account. The credits required per email, SMS text message, pURL, landing page, and direct mail may be predefined. The computer may use the predefined rates and multiply the rates by how many of each type of message are being sent to calculate an overall deduction. At block 310, process 300 ends.

Figure 4:
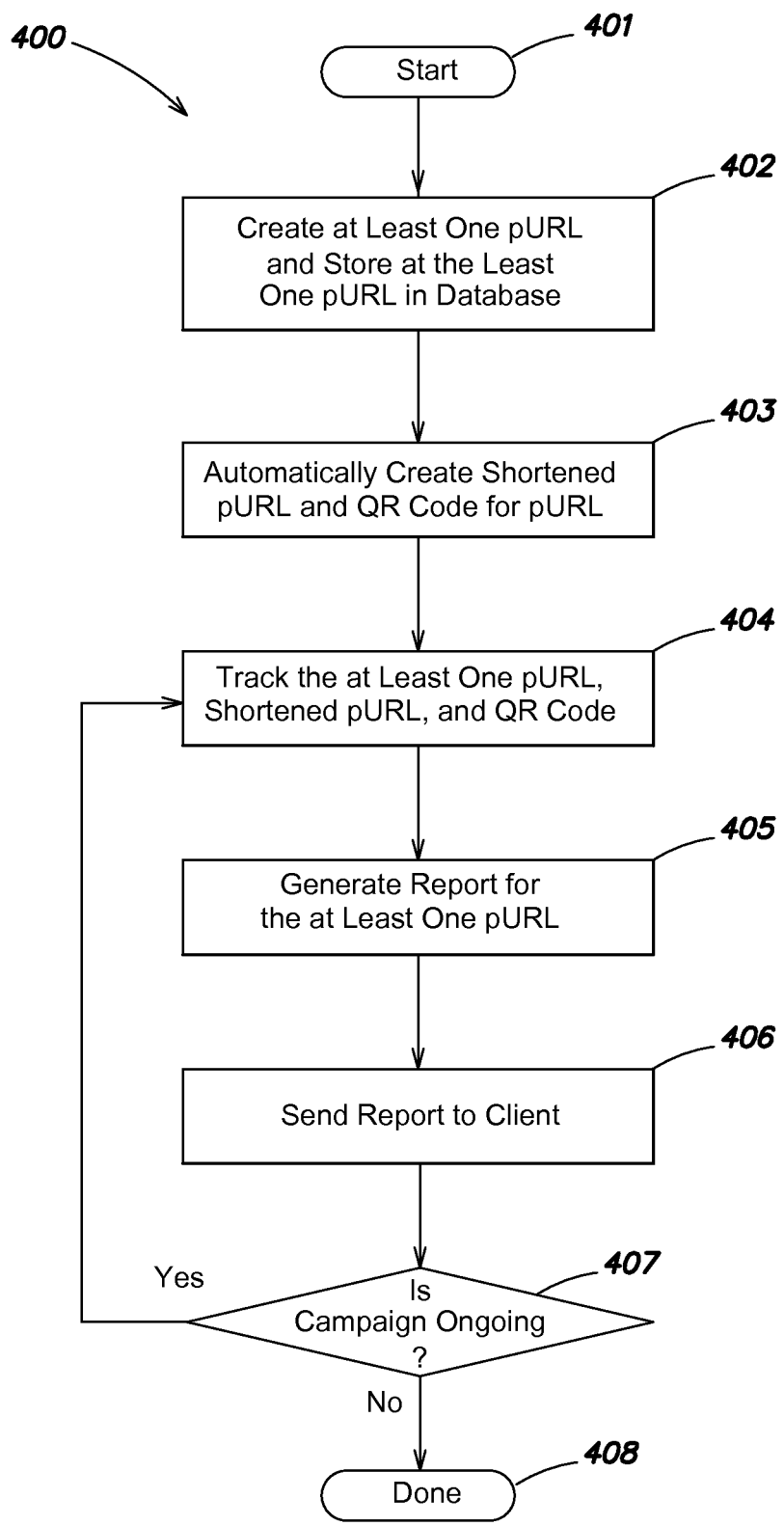
FIG. 4 is a flow diagram illustrating an example process for generating reports of pURLs.

FIG. 4 shows a process for generating reports for a pURL according to one embodiment of the present invention. At block 401, process 400 begins. At block 402, the computer creates at least one pURL relating to a marketing campaign and stores the pURL in a database. The created and stored pURLs may be a group of pURLs that may be linked together or relate to a similar campaign. The database that the URLs are stored in may be any type of database, including a SQL Server database, a MySQL database, a PostgreSQL database, or any other type of database. At block 403, the system may automatically create a shortened pURL to, for example, be used on social media websites and a QR code. The system may generate shortened friendly pURLs as well as the original pURL that may relate to the company's website or a generic domain name. At block 404, the created pURLs are sent to users within emails, direct mail, and SMS text messages and tracked for user interactions. The number of emails and SMS text messages sent out that include a pURL are tracked and opening of the emails and SMS text messages are also tracked. The computer may track clicks on a pURL within an opened webpage or text message. The computer may also track clicks via a third party website through embed code or a search engine. The tracking includes a timestamp for each activity. At block 405, after all of the pURLs are sent out and tracked for a certain amount of time, a report is generated for a user. The amount of time may be received during the creation of the campaign and may be a day, a week, a month, or any other period of time. The report is created with a plurality of charts indicating how many clicks of pURLs were tracked in comparison to how many pURLs were seen (the computer may assume that if an email was open, a pURL was seen), how many emails or SMS text messages were open in comparison to how many emails or SMS text messages were sent out, and how many pURLs were clicked in comparison to how many pURLs were sent out. The report may also include information about all of the pages linked to a main landing page and how many of them were visited. The report may also display how many requests to view a landing page from a third-party webpage were received. The computer may additionally segment the user list based on if a linked page within the main landing page was displayed to a group of users.

According to one embodiment, the report may be grouped with a plurality of other reports for other campaigns. The report may have an optional granularity level to display a report for each page or a report for the campaign as a whole. The report can also be segmented based on variable fields such as, for example, showing only users who have previously clicked on a pURL. The report may show the total number pURLs sent to unique people, how many of those pURLs were displayed to a user, and how many conversions occurred (e.g., how often a form on a page was filled out). The report may also display data according to any time period, as well as what the most active data for a campaign was. Further, the report can display information by day, month, year, or any other period of time. The report is not limited to pURLs; the report can also be reported according to emails, SMS text messages, and lead generation landing pages. The report can also display multiple segmented groups of users side-by-side for comparison purposes. It may be appreciated that a client can view how many users have clicked a pURL in one group in comparison to how many users have clicked a pURL in another group to adjust the target audience of a marketing campaign.

At block 406, the computer sends the report to the client. In some embodiments the report is updated with new information so the new information can be displayed along with older information. In some embodiments the report URL is the same as the old report URL, so an email or text message is sent to a client to notify that the report has been updated. In some embodiments the computer may be configured to send text messages or emails in response to a click of a pURL or an opening of an email. At block 407, the length of the campaign is checked. If the campaign is ongoing, the computer may continue to track all of the associated emails, SMS text messages, landing pages, and pURLs. In some embodiments, if the campaign has ended, the computer may continue to track the pURLs if they are still running. In other embodiments the landing page is removed from service and tracking along with it. At block 408, process 400 ends.

Figure 5:
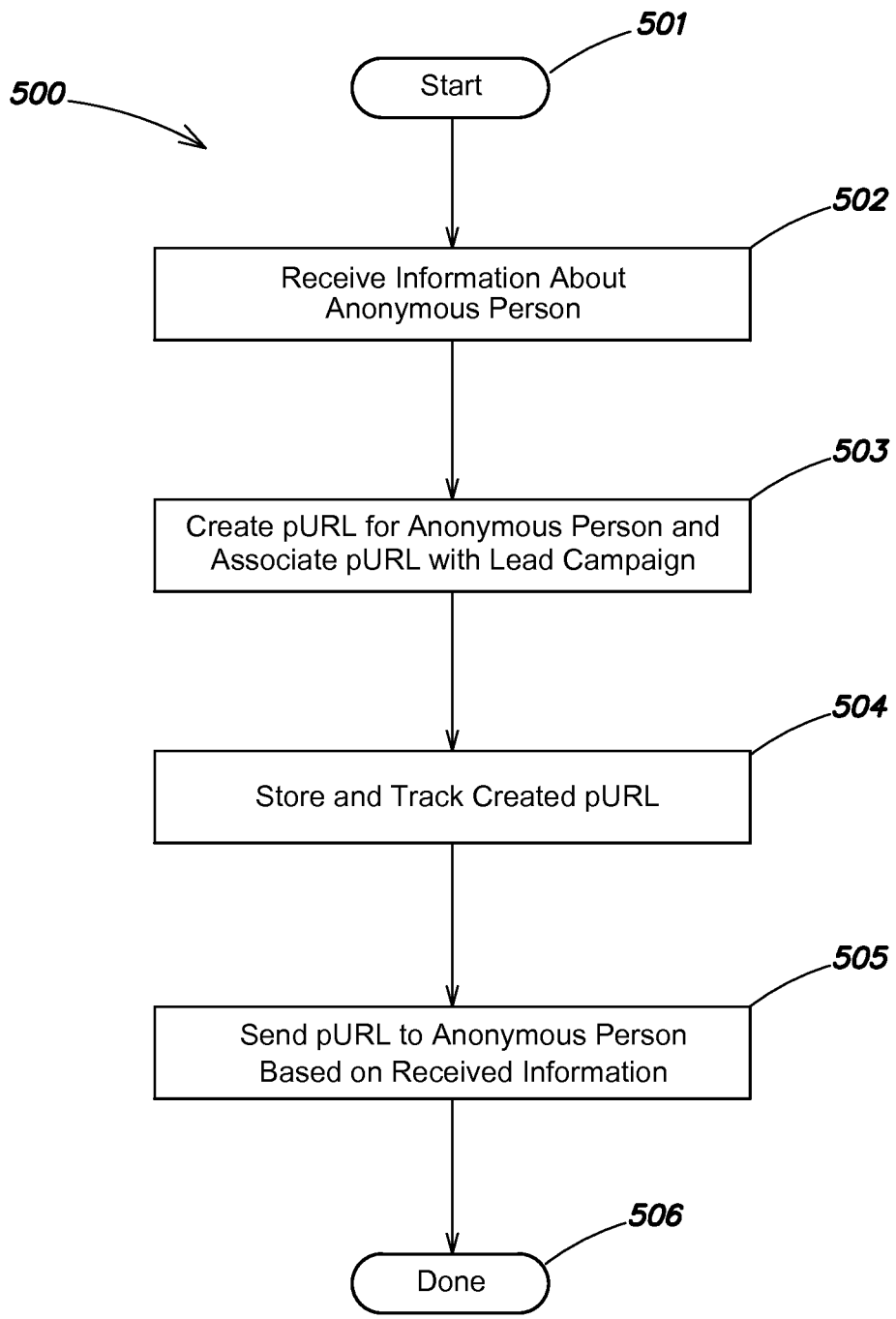
FIG. 5 is a flow diagram illustrating an example process for creating a pURL for an anonymous person from a lead campaign, according to one embodiment.

FIG. 5 shows a process for receiving a referral to link a marketing campaign with one or more additional users and tracking the linked marketing campaign according to one embodiment of the present invention. At block 501, process 500 begins. At block 502, the computer receives information about an anonymous person. The information may include a first name, a last name, an email address, a phone number, a home address, an occupation, a company, a Twitter Handle, a LinkedIn Id, a Facebook URL, or custom fields such as notes about the anonymous person. The information may be stored in a user database. At block 503 one or more pURLs are created for the anonymous person based on the received information. The pURLs, landing pages, emails, and SMS text messages are all customized for the targeted person using the information received in block 502. The created pURLs, emails, SMS text messages, direct mail messages, and landing pages are associated with the lead campaign to use all of the templates and elements of the lead campaign. The pURLs, emails, SMS text messages, direct mail messages, and landing pages may be based off of the lead campaign's emails, SMS text messages, and landing pages with more customized information according to the user information of the newly added user. At block 504, the created pURLs, landing pages, emails, and SMS text messages, along with their statuses (opened, not opened, clicked, not clicked) are stored in a database and tracked. The database may also include counters for each of the messages and pURLs so, for example, if a pURL is clicked multiple times one of the counters will increase to indicate those clicks. The pURLs, landing pages, emails, and SMS text messages may also have a field in the database to indicate a mapping to a new user added through a form on one of the pURLs, landing pages, emails, or SMS text messages.

According to some embodiments of the present invention, at block 505 the email, SMS text message, or direct mail message with at least one pURL to a landing page is sent to the newly added user based on the information provided in a form on a previous page. The messages and pURLs are tracked and the computer may be configured to notify a client of a pURL click or an email opening. New information added to a report is also created for the new user, which can be displayed within an aggregate of information for all of the users within a group or within the campaign as a whole. At block 506, process 500 ends.

Figure 6:
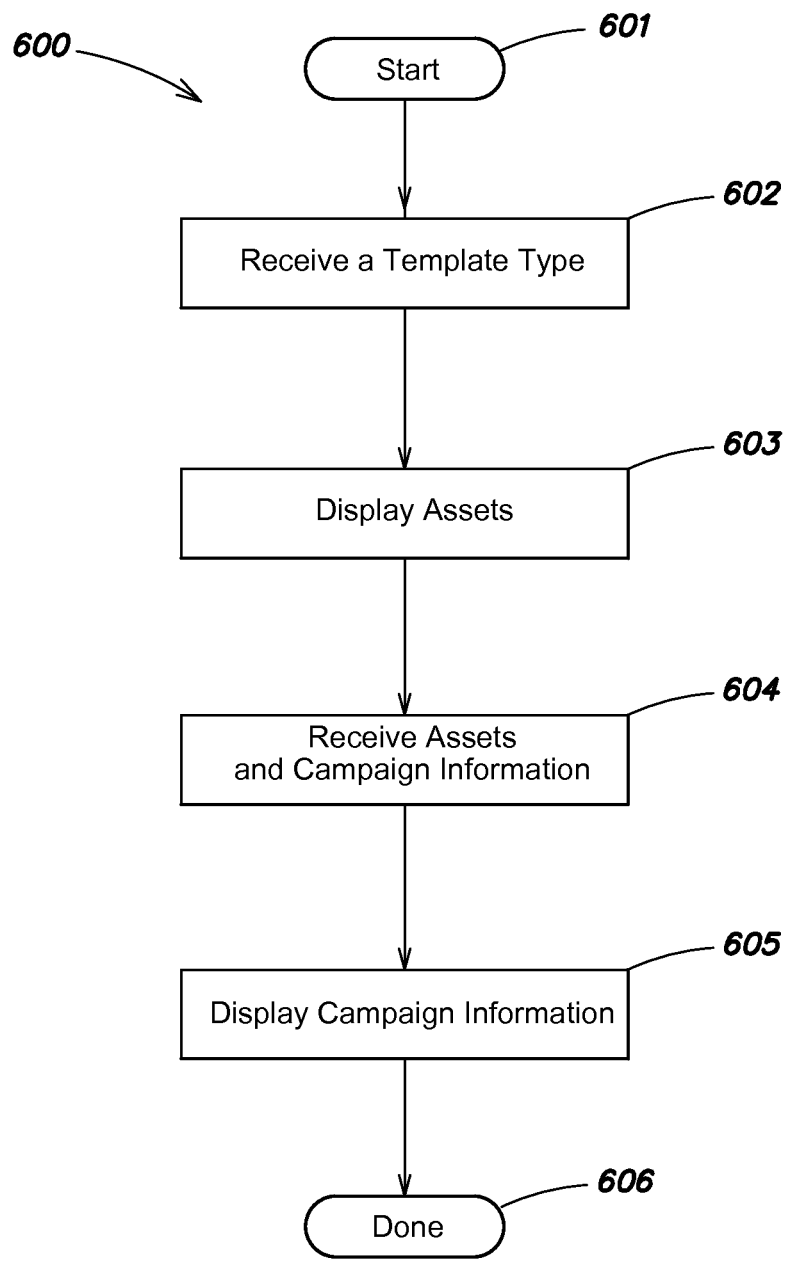
FIG. 6 is a flow diagram illustrating an example process for creating a template, according to one embodiment.

FIG. 6 shows a process for receiving information necessary to generate a campaign according to one embodiment of the present invention. At block 601, process 600 begins. At block 602, the computer receives a template type. The template type may be displayed to a client and received via a click. The template options may include a landing page template, an email template, an SMS template, a new page redirect template, an email template, or a redirect page template. In the case of an email template, the computer may receive information regarding the campaign name, an email subject, the email address that the email is sent from, the name of the client who is controlling the campaign, the mailing address, which is required to be in an email footer for legal compliance, as well as all of the information described below relating to the contents of the email, including the assets, variable data, and contact lists, and sending dates and times. Further, email templates may require a domain name for the sending email and a DNS record setting for sending the emails. The DNS records setting may be created using, for example, Sender Policy Framework (SPF) or DomainKeys Identified Mail (DKIM). DNS records for tracking emails may also be received.

Figure 8:
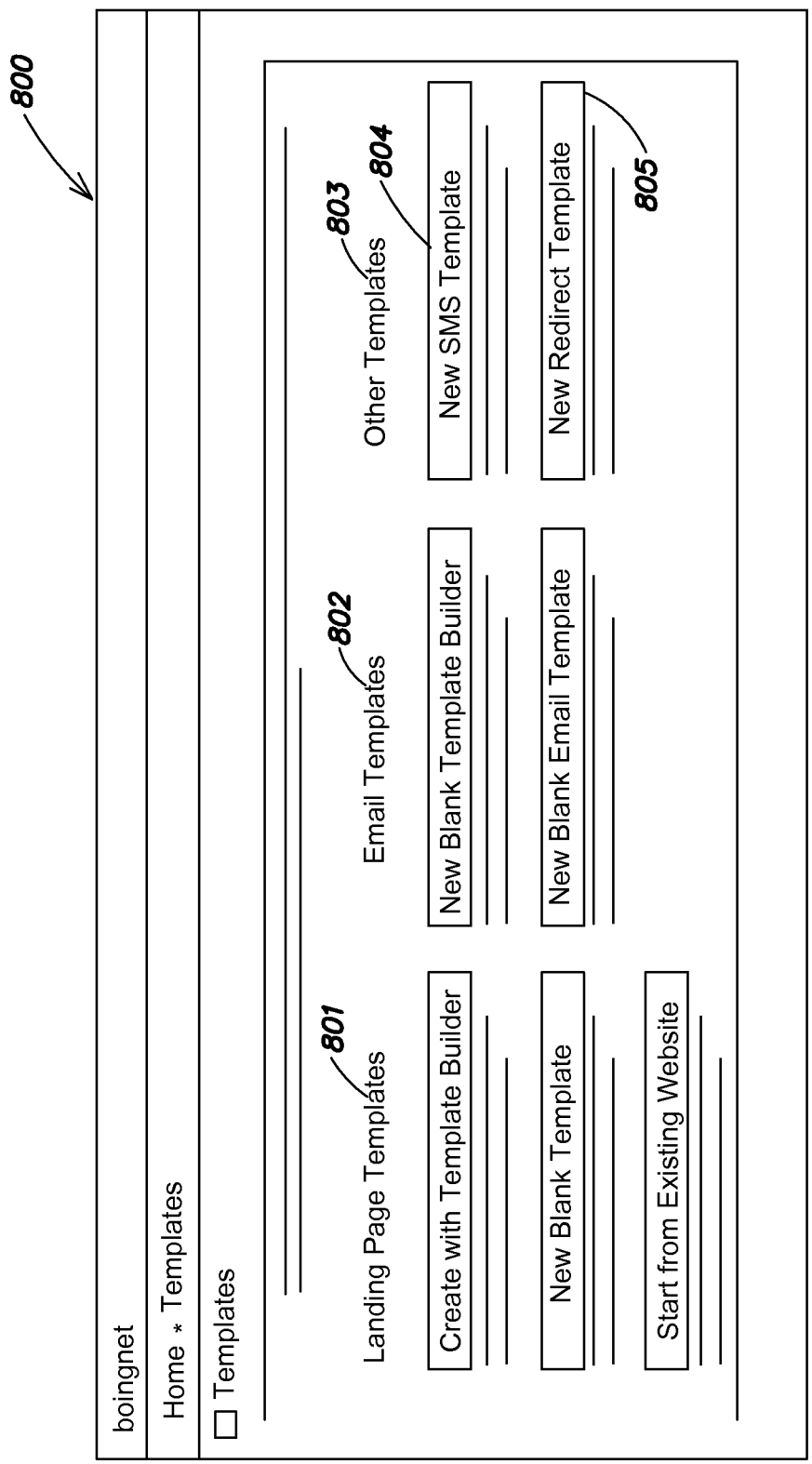
FIG. 8 is an example user interface of a template type choice display.

An example of one embodiment of a page 800 that may receive an input from a user to indicate a page type may be seen in FIG. 8. Multiple types of templates are displayed, each with a custom template builder depending on the type. According to one example, templates displayed include landing page templates 801, email templates 802, and other templates 803, which may include SMS templates 804 and redirect templates 805. The system may receive a redirect template to redirect a landing page to a "thank you" page or an external page. In some embodiments a redirect page can be made with the intention of creating an ad in mind, and the redirect page would be an advertisement that redirects a user to the landing page from another webpage. Referring back to FIG. 6, at block 603, the computer may display various assets. Assets include page or email templates, images, videos, links, variable data, buttons, forms, variable logic, pURLs, meta information about the page, site names, email autoresponders, and other types of assets. Further, once created, a template may be copied over to one or more other campaigns and may be edited individually. Templates may also be stored in a database and quickly displayed on receipt of a search query relating to a template's name or metadata.

Figure 9:
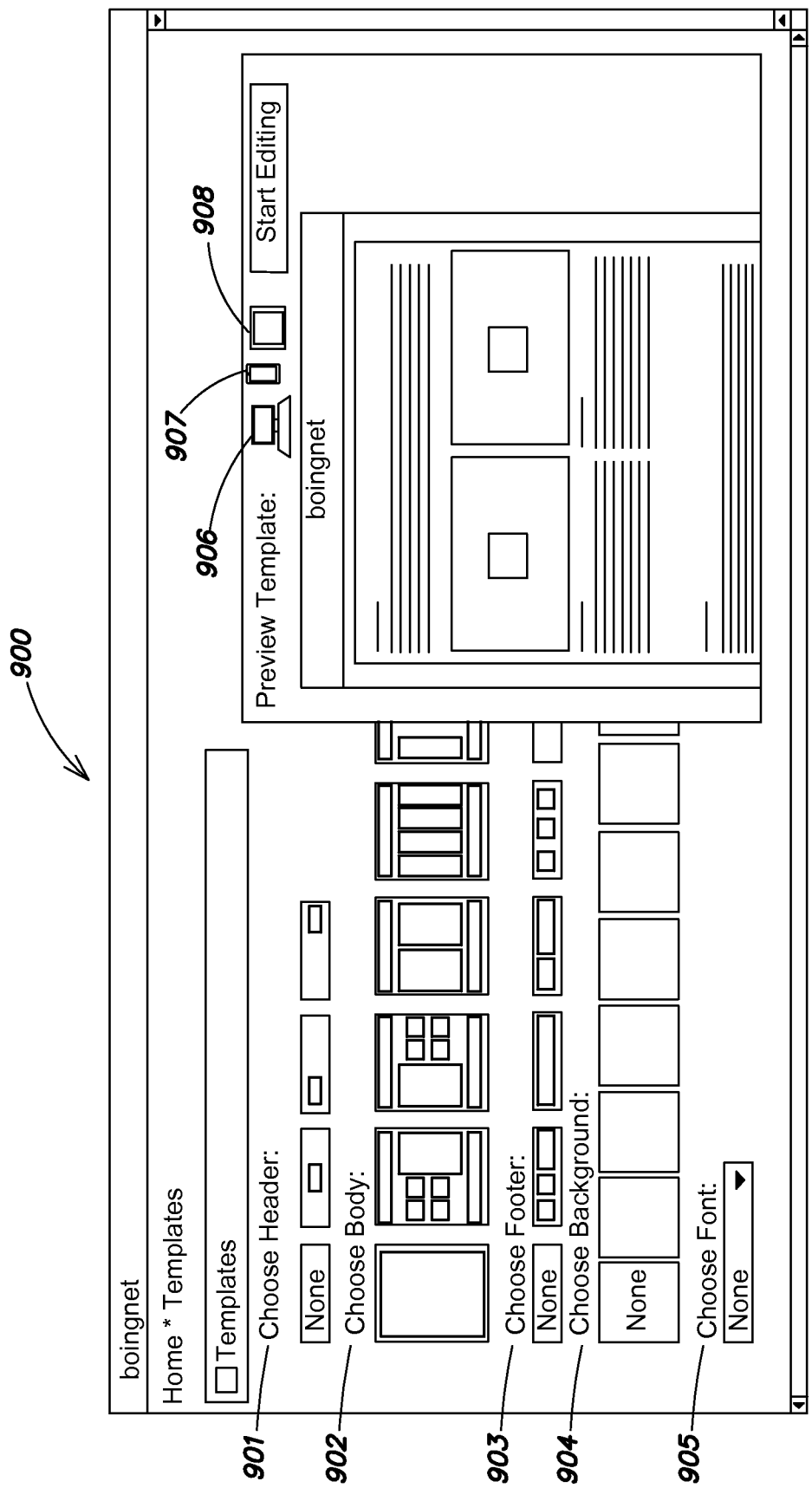
FIG. 9 is an example user interface of a template builder.

An example of one embodiment of webpage templates 900 that may be displayed are described in FIG. 9. Multiple options for a webpage including a header 901, body 902, footer 903, background 904, and font 905 may be chosen. Further, the page template may be displayed in a plurality of views including a desktop computer or laptop view 906, a mobile device view 907, and tablet view 908. The system allows each view to be individually customized. In some embodiments any two of the views can be automatically optimized based on the first view. The system may further be configured to display a preview template of the page being created, and the preview template may update and refresh depending on what options are chosen. In some embodiments the system may receive inputs to cut and paste code. In other embodiments the system may receive inputs to import from template libraries.

Figure 10:
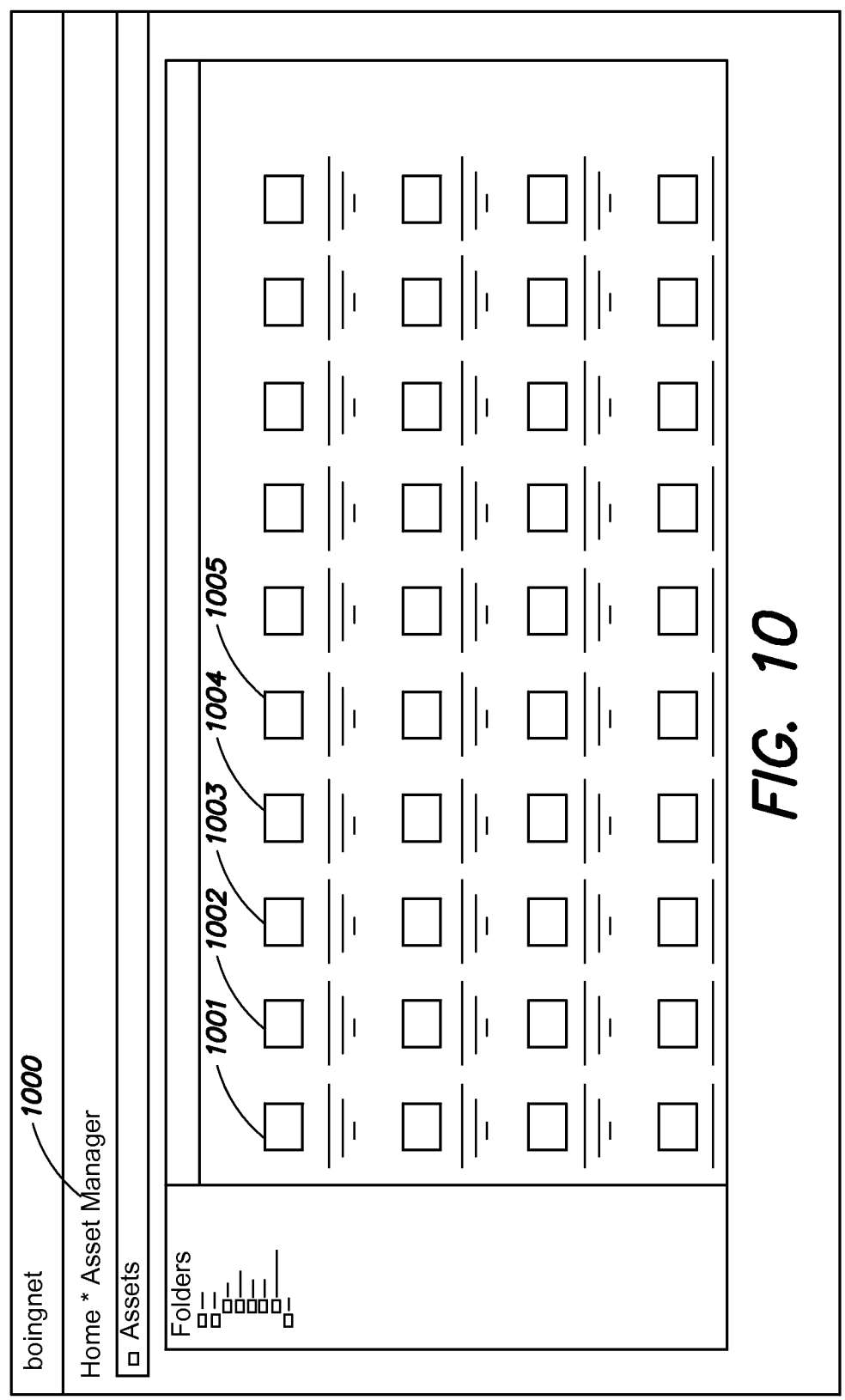
FIG. 10 is an example user interface of an asset manager.

The user interface for building a campaign may display anything that can be rendered in HTML, as seen, for example, in FIG. 10. FIG. 10 is a display of one embodiment of the asset manager 1000. Assets may include images that link to a third-party website such as Google+ 1001, Facebook 1002, Twitter 1003, Youtube 1004, LinkedIn 1005, and others, such as Google Maps. This feature allow marketing campaigns to easily work with other social networks to further increase click rates and be more successful. The assets may also include other buttons, fonts, image links, screenshots, and assets rendered via Adobe Flash. An advertising campaign may incorporate games or animations via Adobe Flash or any other program. Assets may be imported from a client's computer as well as from a received URL. The user interface may allow a received video file to be inserted into a page by automatically generating HTML code to embed the video into the page. Variable data and logic may use IF/THEN statements to display certain content to different users. For example, if a user's home address is near a location with a specific sale, then that sale may be included in the advertising campaign.

Figure 11:
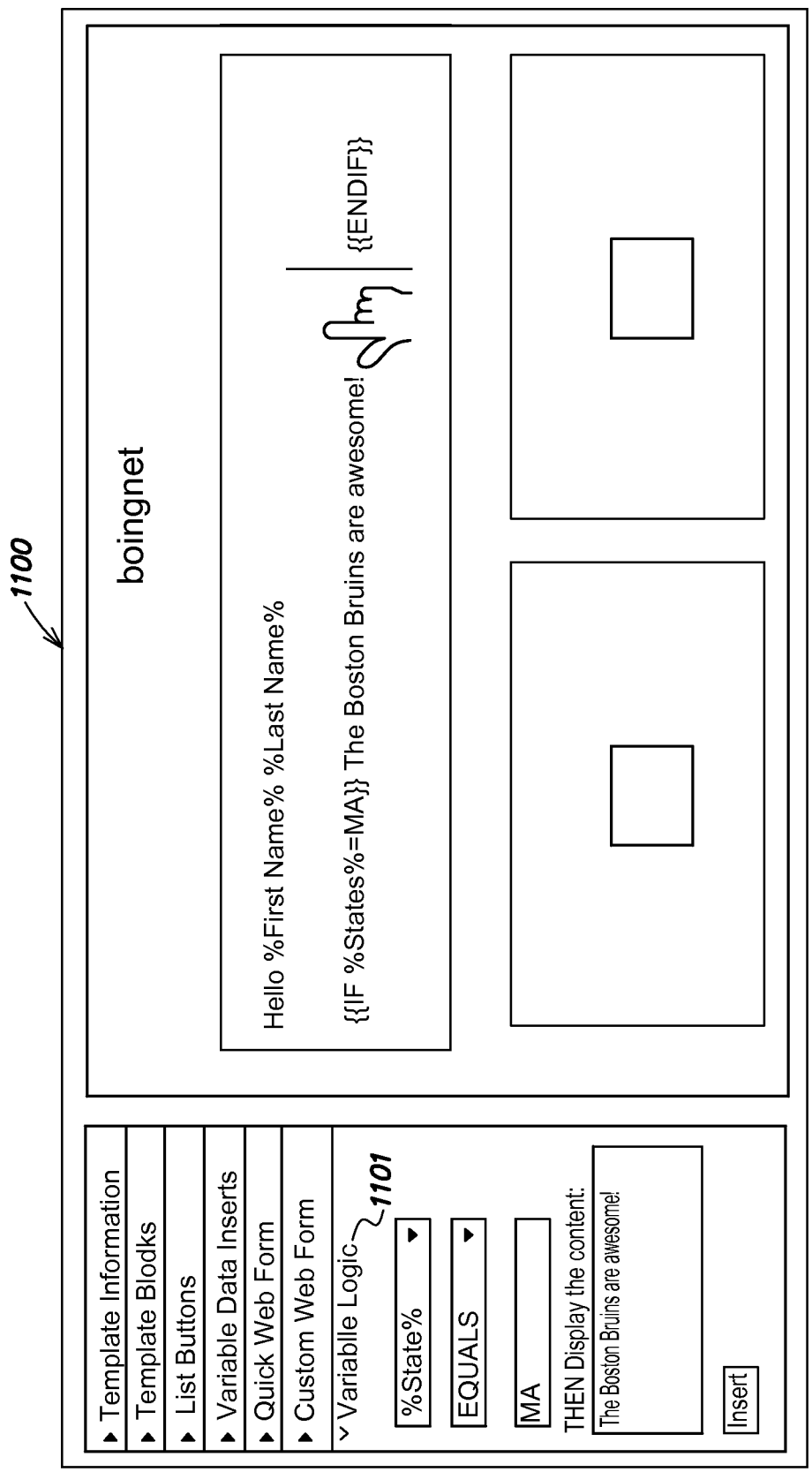
FIG. 11 is an example user interface of variable logic customization.

An example of one embodiment of a page 1100 that allows a user to use variable logic and variable data is shown in FIG. 11. The text on a landing page or email may be customized with user information using data taken from forms. The variable logic 1101 displays a user interface that can receive variable logic inputs in an easy fashion as to preview what the code would look like on the right. Any number of variable logic statements may be used within a webpage or email. An email or page may further include customized web forms, variable data, and linked buttons.

Continuing within block 604, microsite information including friendly URLs, page numbers, template names, page titles, page tags, site names, and meta descriptions may be received as well. A campaign name, URL domain, duration of a campaign, style of a landing page URL, and microsite to display with the campaign are also received. It may be appreciated that variable logic may be used to describe a URL style, as to include personal information within a "friendly URL." For example, if a user is located in Boston, a URL may be "boston.boingnet.com/John_Fall_2014_Deals" to further attract a user named John to click on the link. Metadata may be included defining a plurality of tags that make the campaign appear more often on search engines. The domain may be a generic Boingnet domain or a company's personal domain that can be used for the landing page. In some embodiments a name checker would be included so that if two or more names on a contact list are the same, the pURLs may automatically be updated with a slight edit to make each pURL unique to each user. The update may include changing an underscore to a dash, removing an underscore or dash, or adding an additional number to the end of a pURL to make the pURL unique. In some embodiments if two users are sent a message as part of the same campaign, the pURL in both messages may be the same. The duration for the campaign may define how long a campaign would go on, including how often messages within a drip advertising campaign should be sent. The campaign information may also include notification information on when and how often a client should be notified. A control may be received to notify a client whenever a pURL is clicked or whenever an email is opened in relation to a specific microsite. A control may also be received to send reports at any time.

Controls may also be received to add users to a campaign. Each user may have an associated first name, last name, email address, home address, phone number, and any other associated information such as interests and hobbies. In some embodiments the user information may be updated within a form in a landing page or email. For example, the computer may receive a form indicating that a user enjoys "Electronics," so the landing pages and emails associated with that user may use variable logic to customize the page to include more information relating to electronics. A control may also be received to add a channel. Each channel or campaign added may optionally import a list of users from another channel within a campaign, another campaign, or an external file formatted with the list of users. Each channel or campaign may also export a list of users to a file. The file may be, for example, a CSV file, an XML file, or any other type of file. After a list of users is imported via a file, the fields from the file may show up on a dropdown menu to be mapped to Boingnet contact fields and variable data. For example, if a CSV file is imported with last name, first name, occupation, phone number, email, home address, city, state, zip code, Twitter ID, and Facebook ID, the information would have to be mapped within a user interface so Boingnet may associate those fields with variable data. An example of one embodiment of mapping users to fields in the present invention is shown in FIG. 12. As shown, each of fields displayed in user interface 1200 have associated dropdown menus that contain the information from the file with all of the users in it. In some embodiments, the computer may receive a control to map the contact fields and variable data for all of the users based on the first user in a file. This method assumes consistency in the CSV file as to the way the information is inputted. In some embodiments an empty field of space between fields may indicate an unknown field. For example, if the Middle Name field is left blank in some embodiments of the invention, then either the user has no Middle Name or the Middle Name is unknown. All of the users within a channel or campaign may be stored in a database associated with the channel, campaign, and client. All of the information may be customized while the campaign is active as well.

Information about users to be added to a campaign may be imported from other databases or websites on the Internet. In some embodiments, information is accessed from third-party websites used to track sales leads or other information about potential customers or others to whom outreach may be desirable. The user may be presented with a graphical interface for selecting a third party entity having the sales lead information the user wishes to add to a campaign. For example, the user may be given the option to import data from Salesforce, HubSpot, MailChimp, Microsoft Dynamics, or other third-party offerings. After the user has selected the database, a login screen may be presented so that the user can log in to the third party site using credentials previously established at the third party site. Once the user's credentials have been established, the option may be provided to download all contacts, selected contacts, or particular lists of contacts associated with the user's account. Those contacts may be downloaded for use in the present system. In some embodiments, fields in the third-party database may be automatically mapped to the system; for those fields that cannot be automatically mapped, the user may be presented with the option to manually map the field or, alternatively, to ignore it.

Once all of the campaign information is received, the computer stores the information in a database and calculates how many credits the campaign will cost.

At block 605, the campaign information that was received is displayed. The information may include any of the information received relating to the campaign. An example of campaign information that may be displayed is shown in FIG. 13, as a confirmation page. In this example, some of the campaign information 1301 that is displayed includes the campaign type 1302, campaign starting date 1303, the contact list that the campaign will be sent out to 1304, the name of the microsite used by the campaign 1305, whether or not a request to send emails to a client upon opening 1306, and whether or not a request to send emails upon completion 1307. The email notification on opened 1306 may include email notifications when an email or pURL is opened. The email notification on completed may include sending an email to a client whenever a form is completed within a campaign. The displayed information may further include payment information 1308. The payment information may include credit information 1309 regarding how many credits are to be used to create, for example, landing pages within a campaign. The displayed information may also display a landing page preview 1310, which may include a URL 1311 of a preview landing page. Further options may be displayed to receive a control to generate a QR code for a landing page, edit landing page URLs, edit a contact list associated with a campaign, or display a report associated with a landing page. The computer may also receive a control to send the files of a pURL with all associated landing pages to a user to be edited. Options may be further displayed to add or edit a drip campaign by adding times to send messages, deleting times to send messages, or changing groups of users who messages are sent to. For example, the computer may actively segment the contact list over the course of a campaign based on how the pURLs associated with the campaign are responded to. The contact list may be split by groups who have clicked on emails, groups who have clicked on pURLs within emails or SMS text messages, groups who have filled out a form, groups who have referred a friend via a received list, and others. Some embodiments include a control that allows a campaign to add channels throughout the course of the campaign. For example, an email, SMS text message, or direct mail channel may be added to a campaign that only consisted of one or two of the three channels beforehand. Further, in some embodiments, for example, a Twitter, Facebook, or LinkedIn feed may be added that may use variable logic and pURLs to advertise via various social networks. In some embodiments multiple contact lists may be combined in a campaign. The combination of contact lists would include a duplicate checker to verify that each and every email address and phone number is unique and associated with a unique user. It may be appreciated that this duplicate checker makes for a simple way to reduce sending more messages than necessary. Referring back to FIG. 6, at block 606, process 600 ends.

Figure 7:
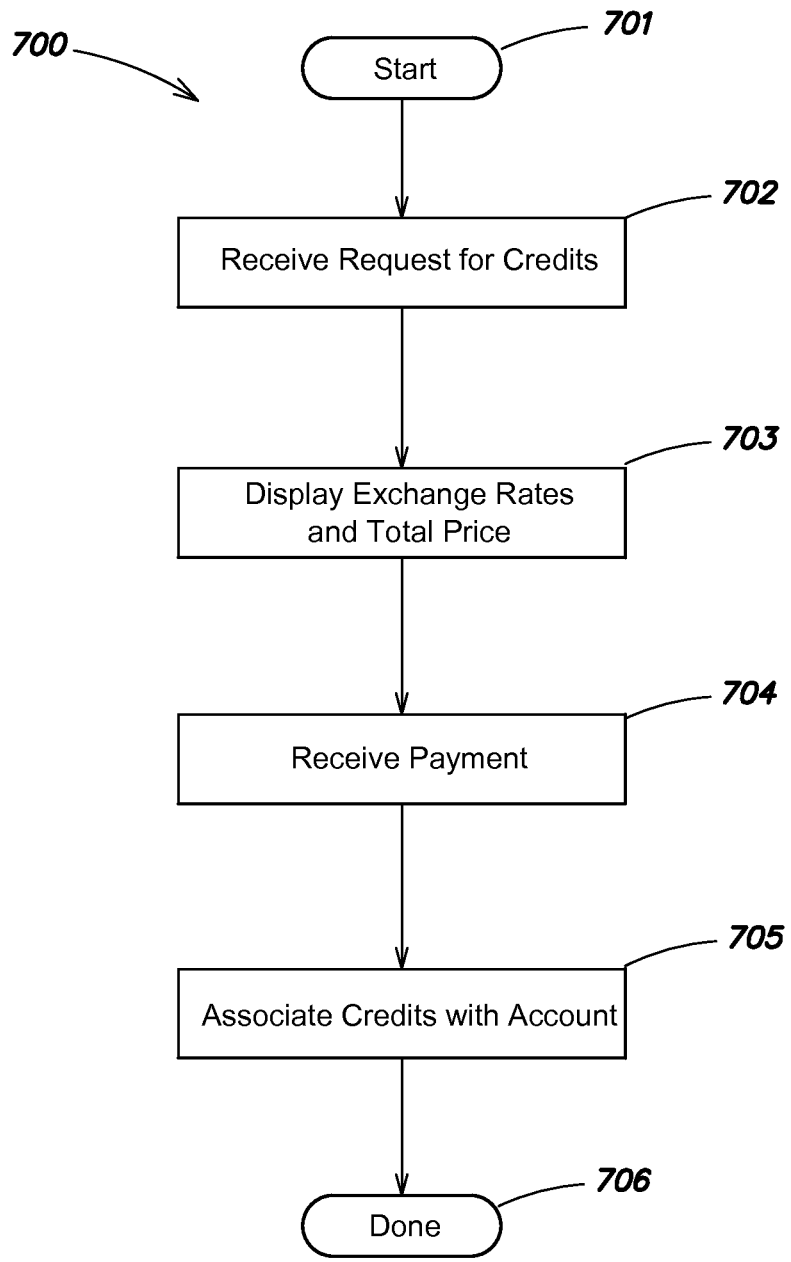
FIG. 7 is a flow diagram illustrating an example process for receiving a payment.

FIG. 7 shows a process for receiving payment and associating credits with a client's account according to one embodiment of the present invention. At act 701, process 700 begins. At act 702, the computer receives a request for a certain amount of credits. The credits may include, for example, pURL credits, email credits, landing page credits, SMS phone number credits, SMS text messaging credits, direct mail credits, or any other type of credit that may be used. Each credit may last for a specified period of time. Each type of credit may cost a different amount. For example, a pURL credit may cost more than an email credit. Once a request for credits is received, at act 703, the computer may calculate a price for the combination of all of the requested credits and display the exchange rates for each credit along with the total price of all of the credits requested.

Figure 14:
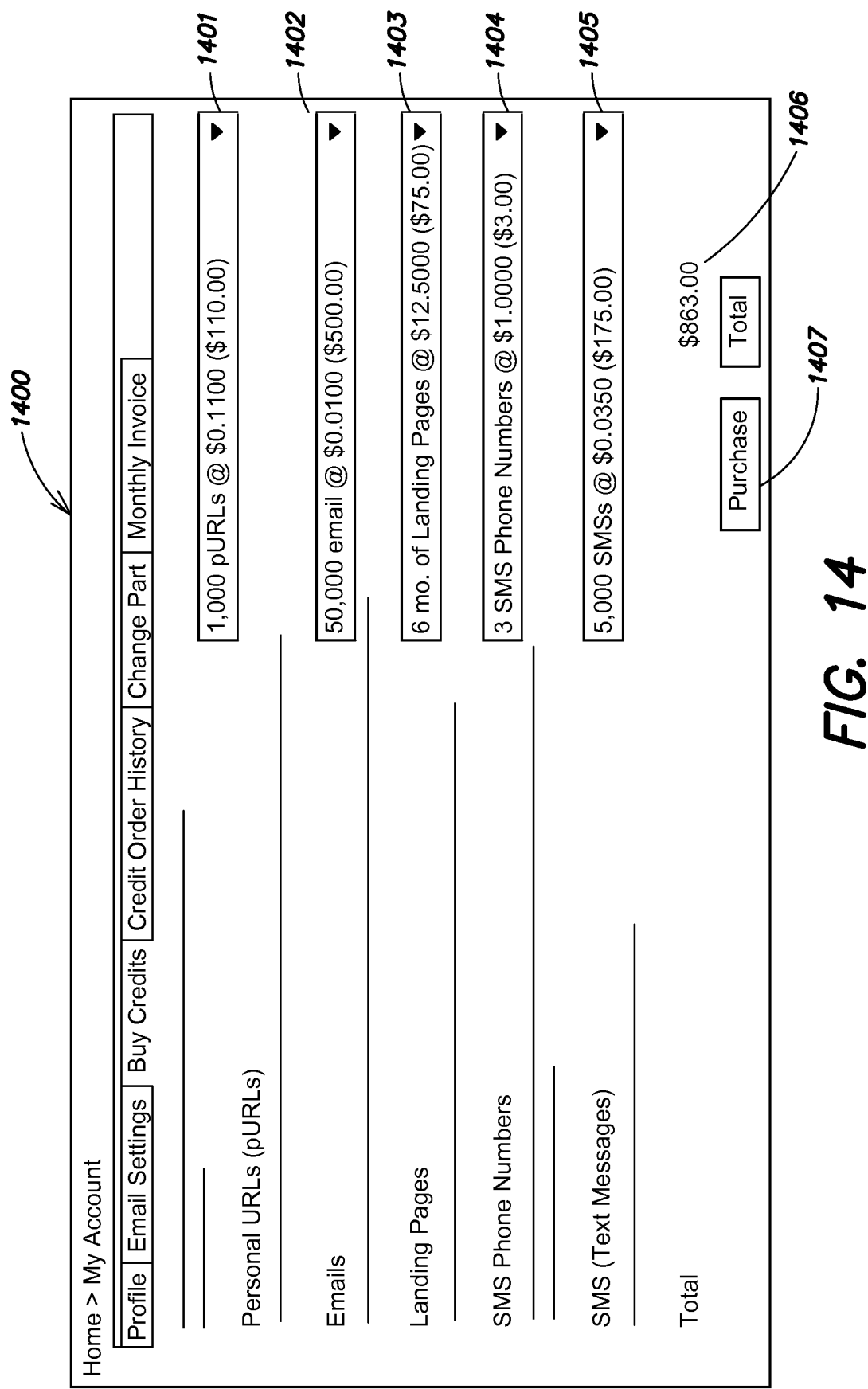
FIG. 14 is an example user interface of a credit purchasing page.

An example of one embodiment of a page 1400 showing the price of credits with their respective exchange rates is shown in FIG. 14. In this example, a request has been received including an order 1401 for 1000 pURLs, an order 1402 for 50,000 emails, an order 1403 for 6 months of landing pages, an order 1404 for 8 SMS phone numbers, and an order 1405 for 5000 SMS text messages. The exchange rates for each credit is displayed with the requested number of credits and the total price 1406 of the combination of all of the requested credits is displayed on the bottom of the page next to a purchase button 1407. At act 704, the computer receives payment for the credits. The computer may receive payment via a credit card, a debit card, a gift card, Paypal, a third-party application, or any other type of electronic payment method. In some embodiments the user information relating to the payment may be securely stored for future purchases. Once payment have been received and verified, at act 705, the computer may associate the credits with the user account. This association may comprise linking an account with a number of credits. Further, PAYG credits may be requested from clients who are already associated with a number of PAYG credits or a monthly credit plan. In some embodiments, the newly bought PAYG credits are spent in a queue after the currently owned PAYG credits. The new credits expire later, so the old credits should be spend first. In cases where a user purchases credits while already associated with a monthly plan, if the monthly plan does not include unlimited credits for a type of credit, the computer may add the pay-as-you-go credits to a client's account on top of the monthly credits that are associated with the client. In some embodiments the credits are used based on their expiration dates. For example, if a monthly credit expires on October $31^{st}$ but a PAYG credit expires on October $25^{th}$, the system may be configured to use the PAYG credit may be used before the monthly credit. In some embodiments a control may be received for which credit should be used. Once the credits are associated with the user account, at act 706, process 700 ends.

Processes 300, 400, 500, 600 and 700 each depict one particular sequence of acts in a particular embodiment. The acts included in these processes may be performed by, or using, one or more computer systems specially configured as discussed herein. Some acts are optional and, as such, may be omitted in accord with one or more embodiments. Additionally, the order of acts can be altered, or other acts can be added, without departing from the scope of the embodiments described herein.

It will be appreciated that the present system and methods may be accessed in any number of ways. Access to the system may be provided through an API, whereby a third-party application may be allowed to access the system and its functionality through a number of interface functions exposed to the application. For example, the third-party application may be provided access to sendMail( ) or sendSMS( ) functions that trigger aspects of the functionality described herein by providing, as a parameter to the function call, a list of contacts to be contacted as part of a campaign. As a further example, the application may be given rights to access a createpURL( ) function, allowing the application to generate pURLs for a campaign.

In some embodiments, the system may allow for the creation of an agency account, which can be used by a user (e.g., an advertising agency) to control the campaigns of a number of clients. In some embodiments, the user may pay a recurring fee (e.g., monthly subscription) to maintain and operate an agency account. Individual client campaigns may be created, controlled, and carried out as discussed herein, with the added functionality of viewing, creating, and modifying individual campaigns for different clients and/or campaigns. For example, the user may be provided with a dashboard for viewing a list of clients and aggregate information about that client's current and/or historical campaigns. Such information may include total spend by the client, total number of impressions, total number of clicks, or other such metrics. It may also be possible, for example by clicking on a control, to expand all of the client's campaigns for a more granular view. For example, the spend on that campaign, the number of impressions made during that campaign, and the number of clicks gotten during the campaign may be presented.

In some embodiments, the user of such an agency account may be provided the opportunity to purchase a number of credits, as discussed above. Once the credits have been purchased by the agency, the system need not track how they are apportioned; the agency may apportion the credits to particular clients and/or campaigns according to need, business plan, or other factors. The agency may then bill clients as desired for the credits spent on the client's campaigns.

In some embodiments, the user of an agency account may be provided the ability to create sub-accounts that clients may access to view various metrics about ongoing, past, and future campaigns.

Example Computer System

Figure 15:
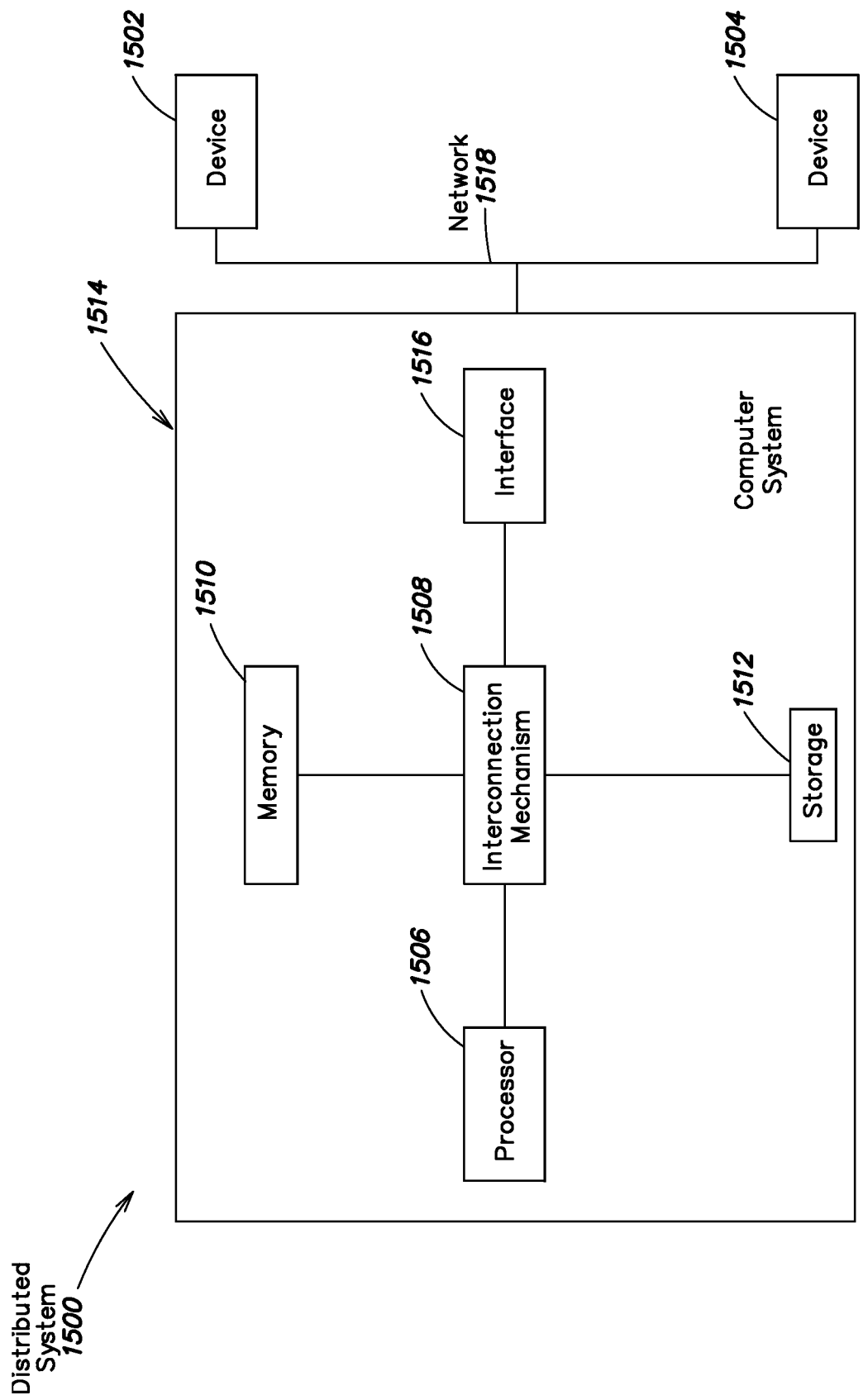
FIG. 15 is a block diagram of one example of a computer system.

FIG. 15 illustrates an example a block diagram of computing components forming a system 1500 which may be configured to implement one or more aspects disclosed herein. For example, the system 1500 may be communicatively coupled to one or more client systems and configured to perform marketing activities described above. The system 1500 may also be used to display information regarding the advertisements to a user.

The distributed system 1500 includes a computer system 1514. The computer system 1514 may include for example a general-purpose computing platform such as those based on Intel PENTIUM-type processor, Motorola PowerPC, Sun UltraSPARC, Texas Instruments-DSP, Hewlett-Packard PA-RISC processors, or any other type of processor. System 1500 may include specially-programmed, special-purpose hardware, for example, an application-specific integrated circuit (ASIC). Various aspects of the present disclosure may be implemented as specialized software executing on the system 1500 such as that shown in FIG. 15.

The system 1500 may include a processor/ASIC 1506 connected to one or more memory devices 1510, such as a disk drive, memory, flash memory or other device for storing data. Memory 1510 may be used for storing programs and data during operation of the system 1500. Components of the computer system 1500 may be coupled by an interconnection mechanism 1508, which may include one or more buses (e.g., between components that are integrated within a same machine) or a network (e.g., between components that reside on separate machines). The interconnection mechanism 1508 enables communications (e.g., data, instructions) to be exchanged between components of the system 1500. Further, in some embodiments the interconnection mechanism 1508 may be disconnected during servicing of a PDU.

The system 1500 also includes one or more input devices 1504, which may include for example, a keyboard or a touch screen. An input device may be used for example to configure the measurement system or to provide input parameters. The system 1500 includes one or more output devices 1502, which may include for example a display. In addition, the computer system 1500 may contain one or more interfaces 1516 that may connect the computer system 1500 to a communication network 1518, in addition or as an alternative to the interconnection mechanism 1508.

The system 1500 may include a storage system 1512, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor 1506 may cause data to be read from the nonvolatile medium into another memory 1510 that allows for faster access to the information by the processor/ASIC 1506 than does the medium. This memory 1510 may be a volatile, random access memory such as a dynamic random access memory (DRAM) or static memory (SRAM). It may be located in storage system 1512 or in memory system 1510. The processor 1506 may manipulate the data within the integrated circuit memory 1510 and then copy the data to the storage 1512 after processing is completed. A variety of mechanisms are known for managing data movement between storage 1512 and the integrated circuit memory element 1510, and the disclosure is not limited thereto. The disclosure is not limited to a particular memory system 1510 or a storage system 1512.

The system 1500 may include a general-purpose computer platform that is programmable using a high-level computer programming language. The distributed system 1500 may be also implemented using specially programmed, special purpose hardware, e.g. an ASIC. The system 1500 may include a processor 1506, which may be a commercially available processor such as the well-known Pentium class processor available from the Intel Corporation. Many other processors are available. The processor 1506 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A computer system for creating a campaign, the computer system comprising:
    a memory; and
    at least one processor operatively connected to the memory, the at least one processor configured to:
        receive one or more content elements and a plurality of advertising credits, the one or more content elements including a template, a personalized URL (pURL), and one or more user-provided content elements;
        generate a portion of content using the one or more user-provided content elements at least in part by applying the received template to the one or more received content elements to personalize the portion of content for one or more users;
        map the pURL to the generated portion of content, wherein the pURL, when accessed by at least one computer, leads the at least one computer to the generated portion of content;
        generate a campaign data structure including the generated portion of content, the pURL, a plurality of communications to be sent to the one or more users, a schedule for sending the plurality of communications, and a storage structure storing the plurality of advertising credits for deductions in response to sending respective ones of the plurality of communications;
        at a first time in the schedule, send a first communication of the plurality of communications including the pURL to the one or more users via a communication channel;
        trigger a first deduction from the storage structure storing the plurality of advertising credits responsive to the act of sending the first communication including the pURL to the one or more users via the communication channel;
        track access of the pURL by the one or more users;
        at a second time in the schedule occurring after the first time:
            determine whether at least one of the one or more users accessed the first communication;
            send a second communication of the plurality of communications to the at least one user when it is determined that the at least one user accessed the first communication; and
            send a third communication of the plurality of communications to the at least one user instead of the second communication when it is determined that the at least one user did not access the first communication; and
        trigger a second deduction from the storage structure storing the plurality of credits responsive to the act of sending the second communication or the third communication.

2. The system according to claim 1, wherein the at least one processor is further configured to dynamically allocate the one or more content elements by applying the template before mapping the pURL to the generated portion of content.

3. The system according to claim 1, further comprising:
    a database;
    wherein the at least one processor is further configured to:
        store the pURL in the database;
        and
            generate a report responsive to tracking the access of the pURL by the one or more users.

4. The system according to claim 1, wherein the at least one processor is further configured to generate shortened pURLs.

5. The system according to claim 1, wherein the portion of content comprises an advertisement.

6. The system according to claim 5, wherein the advertisement is part of a campaign.

7. The system according to claim 1, further comprising:
    an application programming interface (API);
    wherein the at least one processor is further configured to receive at least one of the one or more content elements from the Application Programming Interface (API).

8. The system of claim 1, wherein the plurality of credits are configured to expire after respective time periods and the storage structure storing the plurality of credits comprises a queue ordered based on the respective time periods.

9. The system of claim 1, wherein the at least one processor is further configured to determine the second time in the schedule by determining that a time period after the sending the first communication has expired.

10. A computer-implemented method for creating a campaign, the method comprising acts of:
receiving one or more content elements, the one or more content elements including a template, a personalized URL (pURL), and one or more user-provided content elements;
generating a portion of content that includes the received one or more content elements at least in part by applying the received template to the one or more received content elements to personalize the portion of content for one or more users;
mapping the pURL to the generated portion of content, wherein the pURL, when accessed by at least one computer, leads the at least one computer to the generated portion of content;
receiving a plurality of advertising credits;
generating a campaign data structure including the generated portion of content, the pURL, a plurality of communications to be sent to the one or more users, a schedule for sending the plurality of communications, and a storage structure storing the plurality of advertising credits for deductions in response to sending respective ones of the plurality of communications;
at a first time in the schedule, sending a first communication of the plurality of communications including the pURL to the one or more users via a communication channel;
triggering a first deduction from the storage structure storing the plurality of advertising credits responsive to the act of sending the first communication including the pURL to the one or more users via the communication channel;
tracking access of the pURL by the one or more users;
at a second time in the schedule occurring after the first time:
determining whether at least one of the one or more users accessed the first communication;
sending a second communication of the plurality of communications to the at least one user when it is determined that the at least one user accessed the first communication; and
sending a third communication of the plurality of communications to the at least one user instead of the second communication when it is determined that the at least one user did not access the first communication; and
triggering a second deduction from the storage structure storing the plurality of credits responsive to the act of sending the second communication or the third communication.

11. The method according to claim 10, further comprising generating embed code that allows the portion of content to be displayed within an external webpage.

12. The method according to claim 10, further comprising issuing the plurality of advertising credits as part of a pay as you go (PAYG) marketing campaign.

13. The method according to claim 10, further comprising issuing the plurality of advertising credits as part of a monthly billing marketing campaign.

14. The method according to claim 10, wherein the user-provided content elements includes at least one of at least one email address associated with at least one user and at least one phone number associated with at least one user and the method further comprises sending the first communication including the pURL to the at least one user using the at least one email address.

15. The method according to claim 14, further comprising verifying the at least one email address prior to sending the first communication including the pURL to the one or more receiving users via the communication channel.

16. The method according to claim 15, wherein the communication channel comprises email.

17. The method according to claim 14, further comprising verifying the at least one phone number prior to sending the first communication to the one or more users via the communication channel.

18. The method according to claim 17, wherein the communication channel comprises a short message service (SMS).

19. The method according to claim 10, wherein the portion of content comprises an advertisement.

20. The method according to claim 19, wherein the advertisement is part of a campaign.

21. The method according to claim 10, further comprising sending the first communication responsive to information of the one or more users.

22. The method according to claim 10, wherein the portion of content comprises a microsite.

23. The method according to claim 10, wherein the act of sending the first communication to the one or more receiving users via the communication channel further comprises an act of verifying addresses of the one or more receiving users.

24. The method according to claim 10 further comprising receiving at least one of the one or more content elements from an Application Programming Interface (API).

25. The method according to claim 10, further comprising the act of, responsive to at least one of the one or more users not interacting with the portion of content in a predetermined way, resending the first communication including the pURL to the at least one receiving user.

26. A non-transitory computer readable medium having stored thereon instructions that, when executed by at least one processor, cause the at least one processor to perform a method comprising:
receiving one or more content elements, the one or more content elements including a template, a personalized URL (pURL), and one or more user-provided content elements;
generating a portion of content that includes the received one or more content elements at least in part by applying the received template to the one or more received content elements to personalize the portion of content for one or more users;
mapping the pURL to the generated portion of content, wherein the pURL, when accessed by at least one computer, leads the at least one computer to the generated portion of content;
receiving a plurality of advertising credits;
generating a campaign data structure including the generated portion of content, the pURL, a plurality of communications to be sent to the one or more users, a schedule for sending the plurality of communications, and a storage structure storing the plurality of advertising credits for deductions in response to sending respective ones of the plurality of communications;

at a first time in the schedule, sending a first communication of the plurality of communications including the pURL to the one or more users via a communication channel;
triggering a first deduction from the storage structure storing the plurality of advertising credits responsive to the act of sending the first communication including the pURL to the one or more users via the communication channel;
tracking access of the pURL by the one or more users;
at a second time in the schedule occurring after the first time:
   determining whether at least one of the one or more users accessed the first communication;
   sending a second communication of the plurality of communications to the at least one user when it is determined that the at least one user accessed the first communication; and
   sending a third communication of the plurality of communications to the at least one user instead of the second communication when it is determined that the at least one user did not access the first communication; and
triggering a second deduction from the storage structure storing the plurality of credits responsive to the act of sending the second communication or the third communication.

27. A computer system for creating a campaign, the computer system comprising:
   means for receiving one or more content elements and a plurality of advertising credits, the one or more content elements including a template, a personalized URL (pURL), and one or more user-provided content elements;
   means for generating a portion of content using the received one or more content elements at least in part by applying the received template to the one or more received content elements to personalize the portion of content for one or more users;
   means for mapping the pURL to the generated portion of content, wherein the pURL, when accessed by at least one computer, leads the at least one computer to the generated portion of content;
   means for generating a campaign data structure including the generated portion of content, the pURL, a plurality of communications to be sent to the one or more users, a schedule for sending the plurality of communications, and a storage structure storing the plurality of advertising credits for deductions in response to sending respective ones of the plurality of communications;
   means for sending, at a first time in the schedule, a first communication of the plurality of communications including the pURL to the one or more users via a communication channel;
   means for triggering a first deduction from the storage structure storing the plurality of advertising credits responsive to the act of sending the first communication including the pURL to the one or more users via the communication channel;
   means for tracking access of the pURL by the one or more users;
   means for, at a second time in the schedule occurring after the first time:
      determining whether at least one of the one or more users accessed the first communication;
      sending a second communication of the plurality of communications to the at least one user when it is determined that the at least one user accessed the first communication; and
      sending a third communication of the plurality of communications to the at least one user instead of the second communication when it is determined that the at least one user did not access the first communication; and
   means for triggering a second deduction from the storage structure storing the plurality of credits responsive to the act of sending the second communication or the third communication.

28. The method of claim 10, wherein the plurality of credits are configured to expire after respective time periods and the method further comprises triggering deductions from the storage structure storing the plurality of credits in a queue ordered based on the respective time periods.

29. The method of claim 10, further comprising determining the second time in the schedule by determining that a time period after sending the first communication has expired.

* * * * *